(12) United States Patent
Stephenson et al.

(10) Patent No.: US 7,185,237 B2
(45) Date of Patent: *Feb. 27, 2007

(54) SYSTEMS AND METHODS FOR PROVIDING FOR DEGRADATION OF A COMPUTER APPLICATION

(75) Inventors: Patrick Stephenson, Pittsburgh, PA (US); Robert Barker, Moon Township, PA (US)

(73) Assignee: Quest Software, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/217,513

(22) Filed: Sep. 1, 2005

(65) Prior Publication Data

US 2006/0005086 A1    Jan. 5, 2006

Related U.S. Application Data

(63) Continuation of application No. 09/853,371, filed on May 11, 2001, now Pat. No. 6,944,798.

(60) Provisional application No. 60/203,206, filed on May 11, 2000.

(51) Int. Cl.
*G06F 11/00* (2006.01)
(52) U.S. Cl. .......................... 714/47; 709/223
(58) Field of Classification Search ............ 714/26, 714/47; 709/223
See application file for complete search history.

(56) References Cited

U.S. PATENT DOCUMENTS

| | | | |
|---|---|---|---|
| 5,740,357 A | 4/1998 | Gardiner et al. | |
| 5,974,460 A | 10/1999 | Maddalozzo et al. | |
| 5,974,549 A | 10/1999 | Golan | |
| 6,026,440 A | 2/2000 | Shrader et al. | |
| 6,088,732 A | 7/2000 | Smith et al. | |
| 6,505,244 B1 | 1/2003 | Natarajan et al. | |
| 6,560,717 B1 | 5/2003 | Scott et al. | |
| 6,654,910 B1 | 11/2003 | Eibach et al. | |
| 6,687,226 B1 | 2/2004 | Galyas | |
| 2001/0042227 A1 | 11/2001 | Stephenson et al. | |
| 2004/0027995 A1 | 2/2004 | Miller et al. | |

*Primary Examiner*—Robert Beausoliel
*Assistant Examiner*—Marc Duncan
(74) *Attorney, Agent, or Firm*—Knobbe, Martens, Olson & Bear, LLP

(57) ABSTRACT

A method for providing for the graceful degradation of the performance and functionality of a distributed computer application. A plurality of sensors monitor the performance and availability of various external resources and/or services required by the application, as well as the performance of various components of the application, and report the information to one or more controllers. The controllers make decisions based on rule-based criteria as to how to modify the behavior of the application according to the performance and availability of the various required resources and services. The controllers send messages to one or more actuators which effect the change in behavior of the application. A console displays the status of the system and allows users to modify the rules used to modify the behavior of the application.

19 Claims, 36 Drawing Sheets

Prior Art

Prior Art

Prior Art

Prior Art

Figure 30.

```
// test to see if resource is available
if (actuator.isResourceAvailable()) {
    // enable appropriate menu item
    resourceMenuItem.setEnabled(true);
} else {
    // disable appropriate menu item
    resourceMenuItem.setEnabled(false);
}
```

Figure 31.

```
' test to see if resource is available
If actuator.isResourceAvailable() Then
    ' enable appropriate menu item
    menuItem.enabled = True
Else
    ' disable appropriate menu item
    menuItem.enabled = False
End If
```

SYSTEMS AND METHODS FOR PROVIDING FOR DEGRADATION OF A COMPUTER APPLICATION

RELATED APPLICATIONS

This application is a continuation of and claims priority benefit under 35 U.S.C. § 120 from U.S. patent application Ser. No. 09/853,371, filed May 11, 2001, now U.S. Pat. No. 6,944,798 which is hereby incorporated herein by reference in its entirety, and which claims the benefit priority under 35 U.S.C. § 119(e) of U.S. Provisional Patent Application No. 60/203,206, filed on May 11, 2000.

BACKGROUND OF THE INVENTION

1. Field of the Invention

This invention relates to multi-tier client-server applications, and, in particular, to the performance thereof. Specifically, this invention deals with the operating characteristics of an application based on the performance and availability of the resources and services required by the application.

2. Description of the Related Art

A typical application of the type contemplated by this invention is one that requires multiple resources (hardware and software) from multiple computers, for example, multiple user interfaces utilizing databases, a web application server, another web site, or a mainframe system, and a means for these resources to be connected. Performance of such an application can be degraded at any point for any reason, including scarcity or resources, overloading, etc.

This invention applies to any such multi-tier client-server application. In many cases, the components comprising a multi-tier client server application may be obtained from different software vendors, and have different methods for managing and monitoring their performance and availability.

Typically, such applications implement a multiplicity of business functions, with the implementation of each function being spread out across the various components in the system. For example, an equities trading application might contain business functions for quotes, trading, portfolio management and so on. FIG. 1 shows this example application. A user invocation of one of these functions could result in a chain of messages being sent across various components of the system. As a result, a problem in one of the components may generate symptoms in a number of other components of the system (due to missing or incorrect messages). Typically, the error message eventually seen by the user or system administrator bears little or no relation to the underlying problem. In addition, a problem with one component or resource that is used for one particular business function may result in errors or bottlenecks in other components of the system, which in turn cause failures in other business functions.

As an example, in the system shown in FIG. 2, a Java servlet that implements a user interface to a trade function accessing an Enterprise JavaBean (EJB) running in a web application server. The code that implements the Trade servlet checks the return status each time the Trade EJB is called, and if there has been a failure, it returns an error message to the user. This servlet will be accessed concurrently by many users, and if the function of the Trade Enterprise JavaBean is impaired, there will be a large number of Trade servlets with calls to Trade EJBs waiting for an error to be returned, and in the mean time tying up valuable resources on in the web server. Users attempting to access the Trade function may see a long delay before an error message is returned.

In a complex application, this situation can tie up enough resources on the web server that other unrelated functions begin to exhibit problems as well.

Therefore, it would be desirable to have a means of dealing with-situations in which the performance of an application is degraded due to any reasons, such as the ones discussed above.

SUMMARY OF THE INVENTION

This invention discloses a system and method that will modify the behavior of an application, including but not limited to changing the user interface, based on the performance and availability of the resources and services required by that application.

The invention, termed "graceful degradation," allows the behavior of an application to change in response to performance or availability problems in components that make up the application. For example, the user interface to the application can be modified to prevent users from accessing business functions that are compromised, or the amount of processing capacity devoted to a particular function can be limited.

This graceful degradation helps prevent the users of the system from being exposed to error messages or unexpected behavior caused by performance or availability problems. It also helps prevent performance or availability problems affecting one business function of the application from causing failures in other business functions. The invention can also be used allow the system to respond to excessive load by curtailing non-essential functions or restricting the activities of low-priority users.

As an example, consider the application shown in FIG. 2 and discussed above. Graceful degradation eliminates the delay problem by preventing the Trade servlets from attempting to access the Trade EJBs if they are not available. Instead, the user is quickly given a consistent message, and resources are not tied up waiting for a response from the Trade EJBs.

BRIEF DESCRIPTION OF THE DRAWINGS

FIG. 30 shows HTML codes implementing a sensor according to the current invention.

FIG. 31 shows a Visual Basic implementation of a sensor according to the invention.

DETAILED DESCRIPTION OF THE PREFERRED EMBODIMENTS

The following sections describe the structure of the applications to which the graceful degradation system may apply, the graceful degradation system components, and the operation of the system.

The typical application suited for use with the graceful degradation system will have the following characteristics:

One or more "user interface rendering mechanisms", for example a web server or collection of web servers that generates HTML dynamically.

One or more "external resources or services" upon which the user interface rendering mechanism depends in order to generate its output to the user. In our example, this could be a database, a personalization server, an application implemented using a web application server, another web site, or a mainframe system. The external resources or services may also include systems for delivering some or all of the rendered user interface to the user—e.g. content routing or caching systems such as Akamai or Inktomi.

One or more "user interface presentation mechanisms". In the web example, these would be browsers; and A mechanism by which these components communicate, e.g. a network connecting the components.

Figure 3:
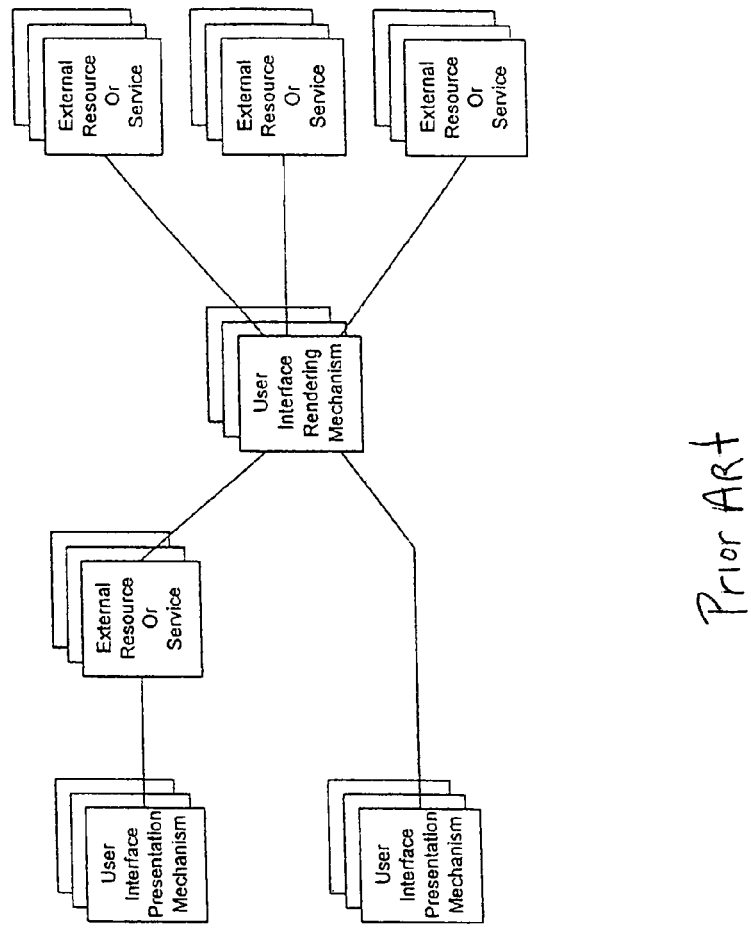
FIG. 3 is a diagram of a typical prior art application suited for use with the invention.
Figure 4:
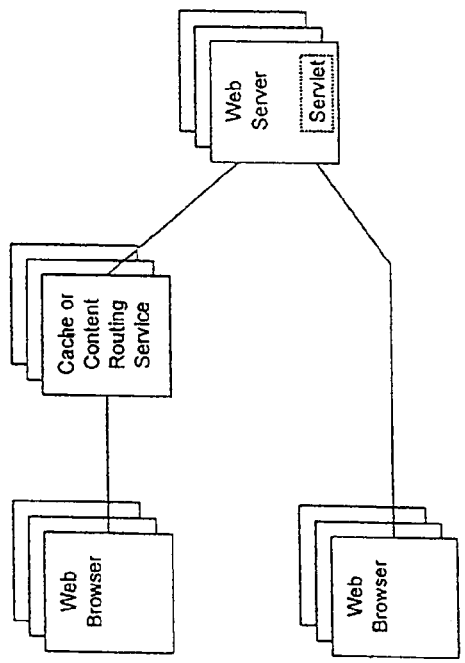
FIG. 4 is the prior art application of FIG. 3 having a slightly different configuration.
Figure 5:
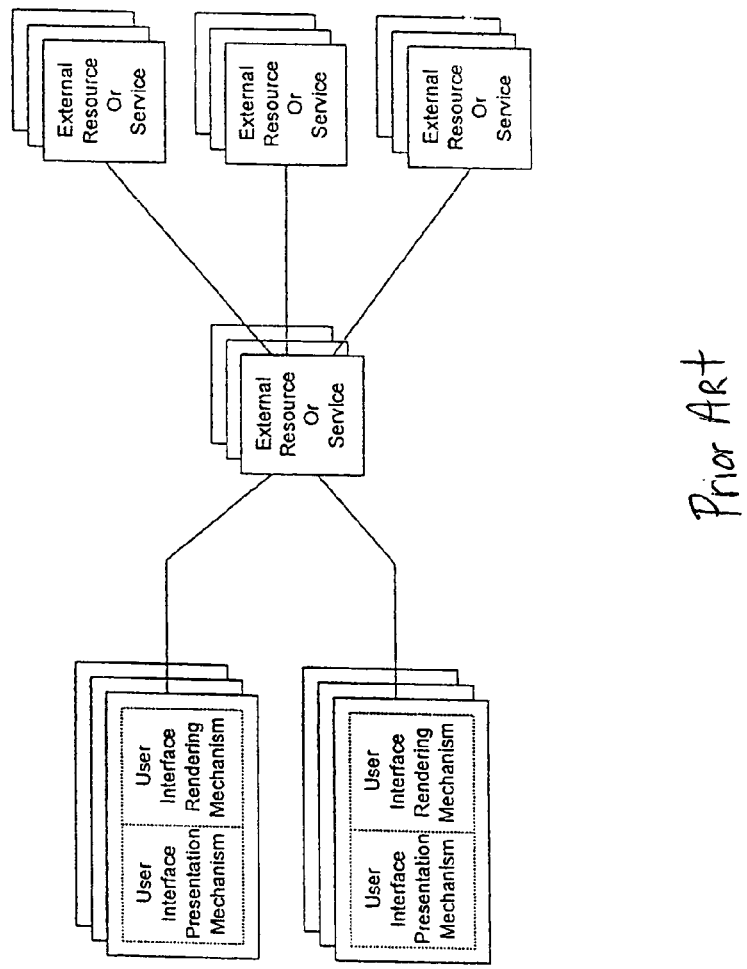
FIG. 5 is a typical prior art multi-tiered client/server application.

An example of the architecture of such an application is shown in FIG. 3. These components of the application need not all be discrete components. For example, the user interface rendering mechanism (e.g. a web server) maybe reside in the same operating system process as one of the external resources (e.g. a Java servlet that implements some business function), as shown in FIG. 4. Another example would be a multi-tier client/server application, where the logical user interface rendering mechanism and user interface presentation mechanism might be combined into a single graphical user interface process, as shown in FIG. 5.

A complex application may be composed of one or more sub-applications or functions, each of which may be in different states. In the web example shown in FIG. 1, the application would be the web equities trading, and the sub-applications or functions would be quote, trade, etc.

Figure 6:
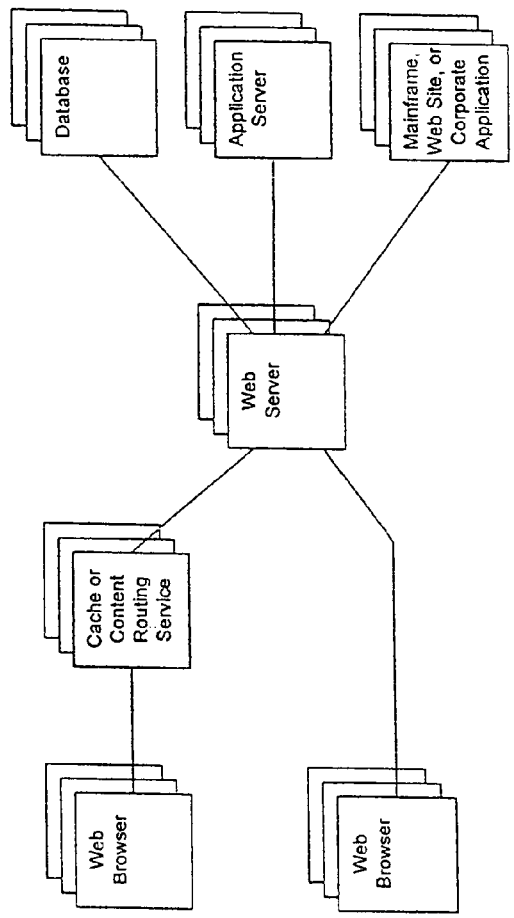
FIG. 6 is a prior art example of the system of FIG. 5 being implemented on the web.
Figure 7:
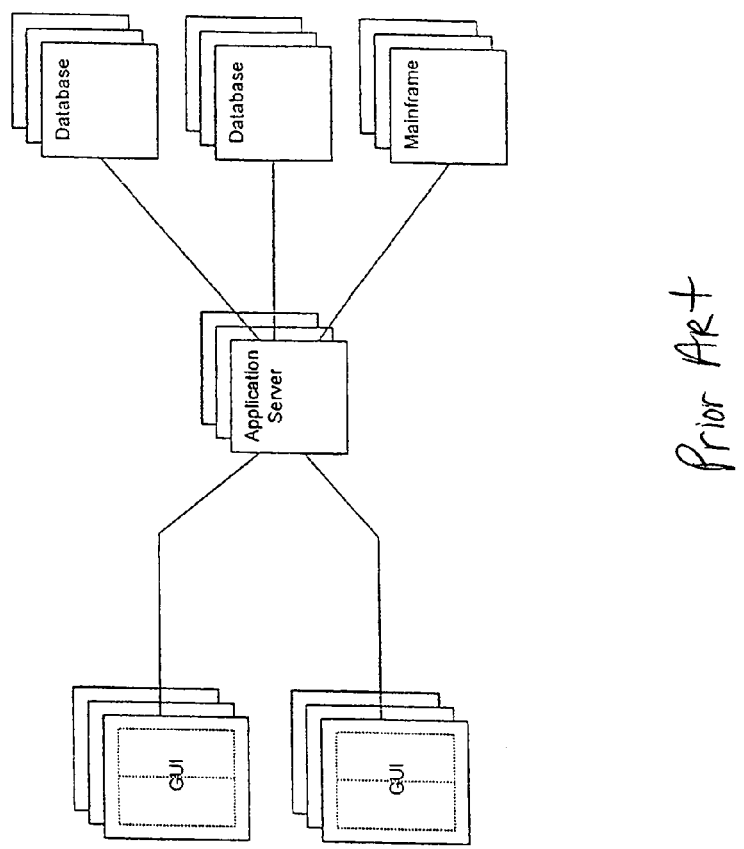
FIG. 7 is a prior art multi-tiered client/server application.

An important current instance of an application to which the system would apply is a web application, as shown in FIG. 6. Another application would be a multi-tier client/server application such as the one depicted in FIG. 7.

The graceful degradation system comprises the following components:

A number of "Sensors" (a particular installation may have zero or more sensors);

A "Controller" (a particular installation may use one or more controllers);

A "Console" (a particular installation may not use the visual console); and

A number of "Actuators" (a particular installation may have zero or more actuators).

Figure 8:
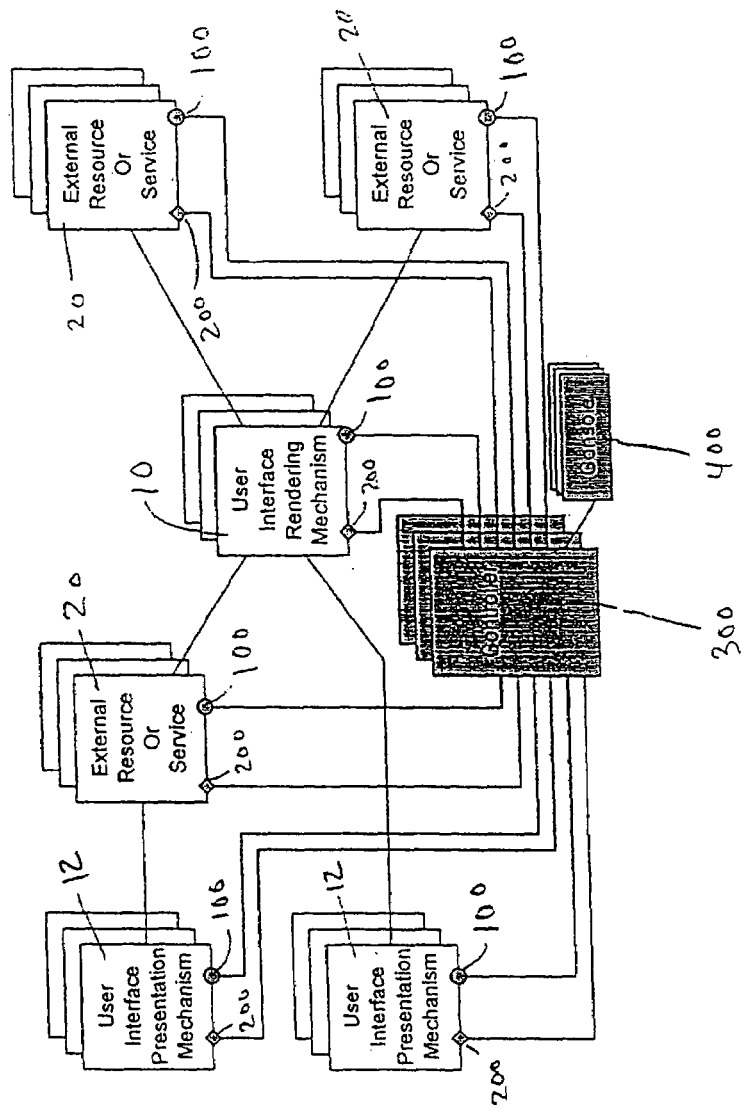
FIG. 8 is an example application showing the current invention incorporated therein.
Figure 9:
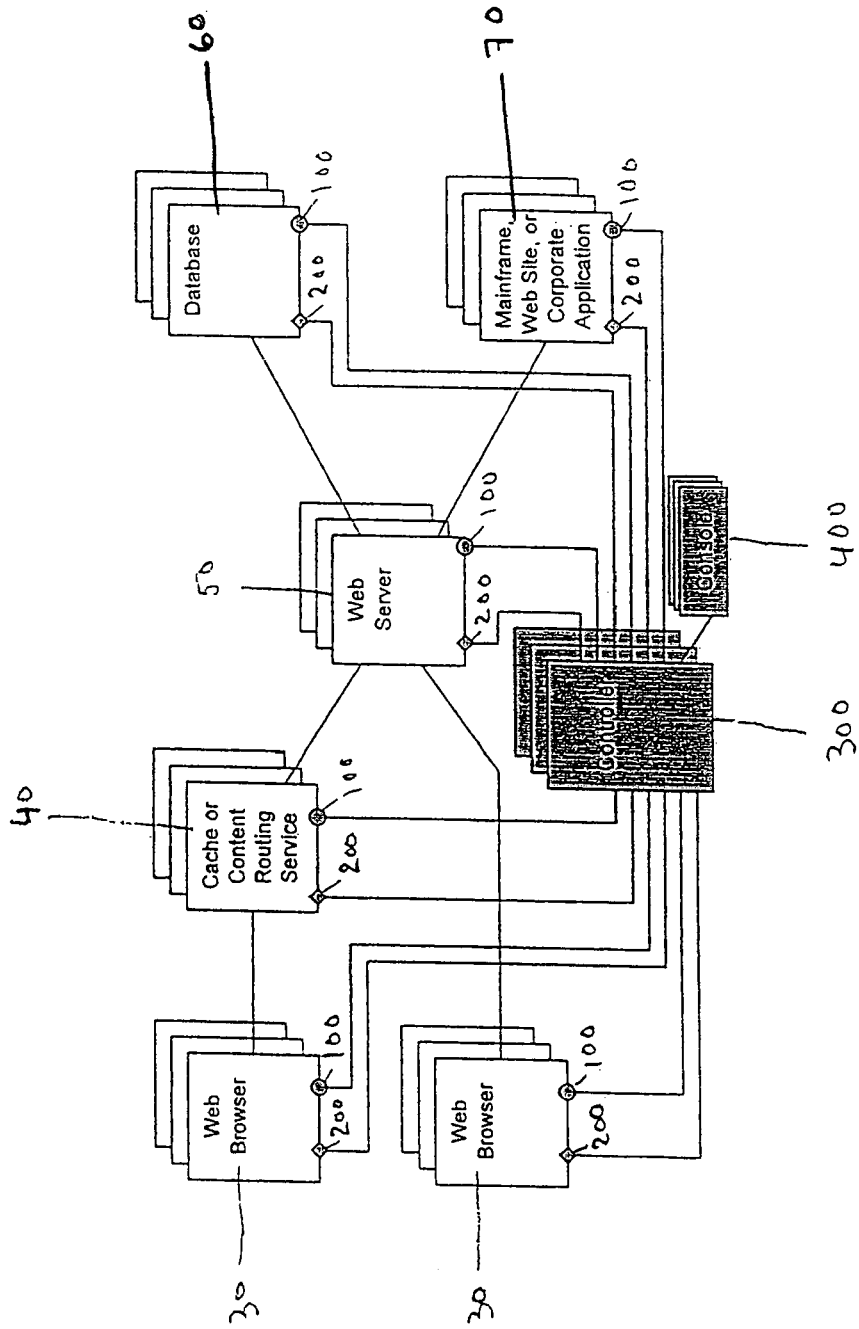
FIG. 9 is an example of the current invention applied to an example web application.
Figure 10:
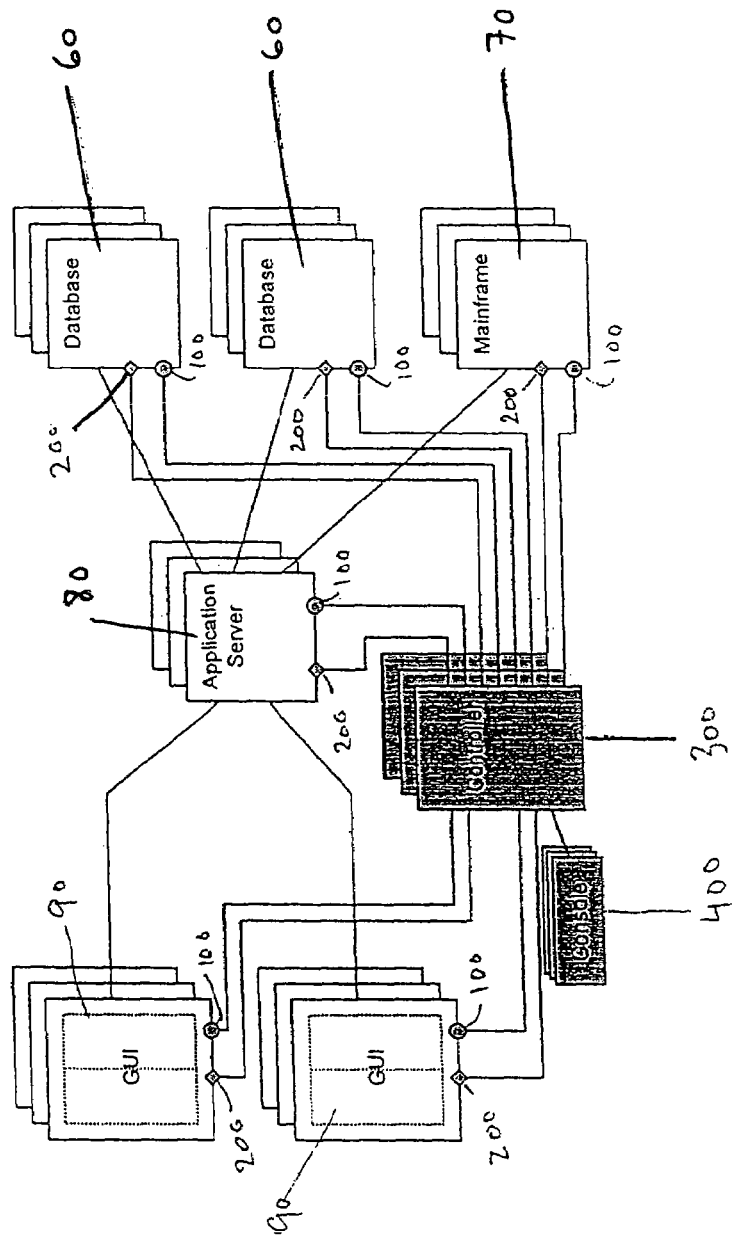
FIG. 10 is an example of the current invention as applied to a multi-tiered client/server application.

The components of the system are depicted in FIG. 8 along with an example application to which it applies. Sensors 100 measure the behavior of the various components and resources making up the system; these measurements are communicated to controller 300. Controller 300 then applies built-in or user-specified rules and generates messages to another controller, output on the console or messages to actuators 200 to affect the behavior of the system. The following sections explain these components and the operation of the system in more detail. FIG. 9 shows the system applied to an example web application, and FIG. 10 shows the system applied to the multi-tier client/server application.

Figure 11:
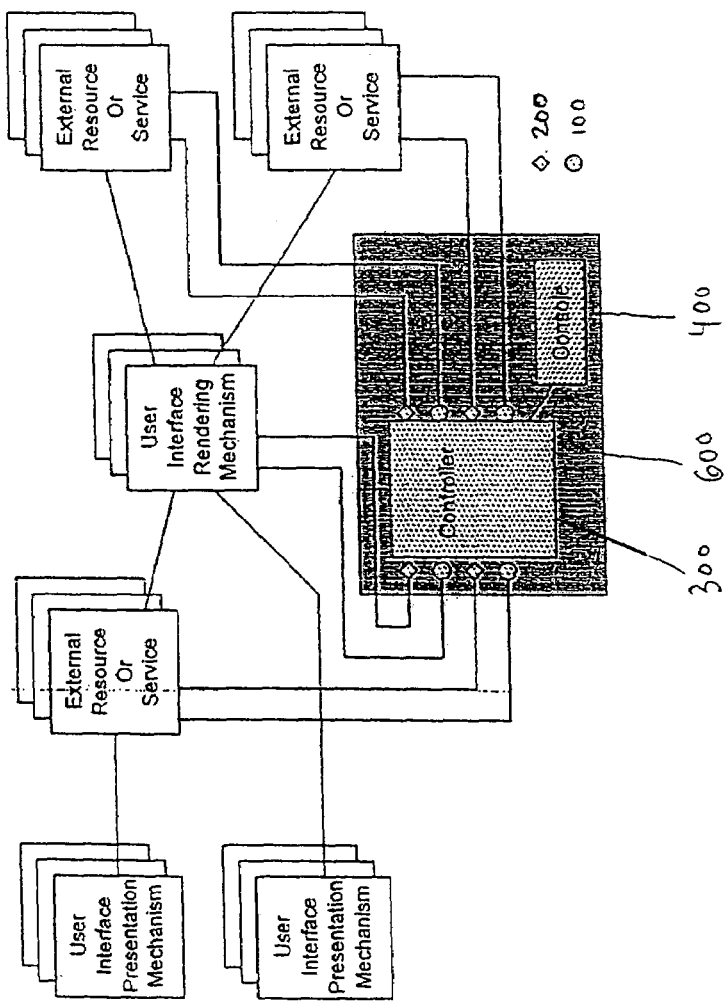
FIG. 11 shows the current invention having some elements combined into a single unit.
Figure 12:
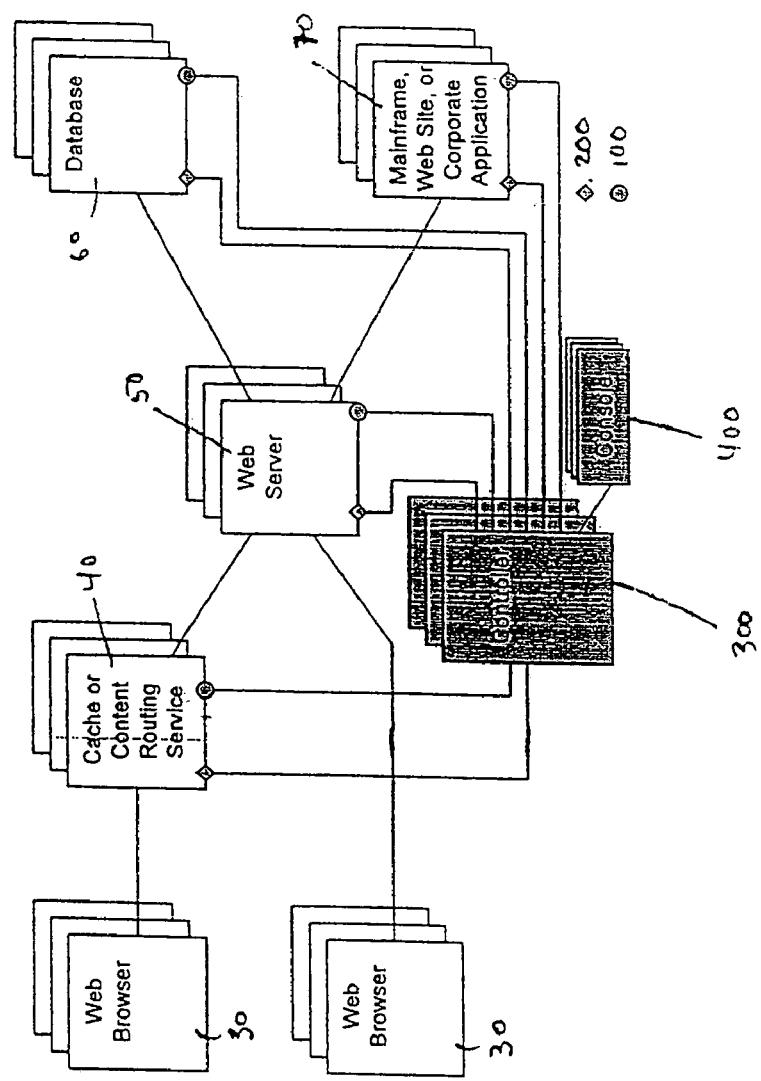
FIG. 12 shows the current invention wherein some components of the application lack various components of the system of the current invention.
Figure 13:
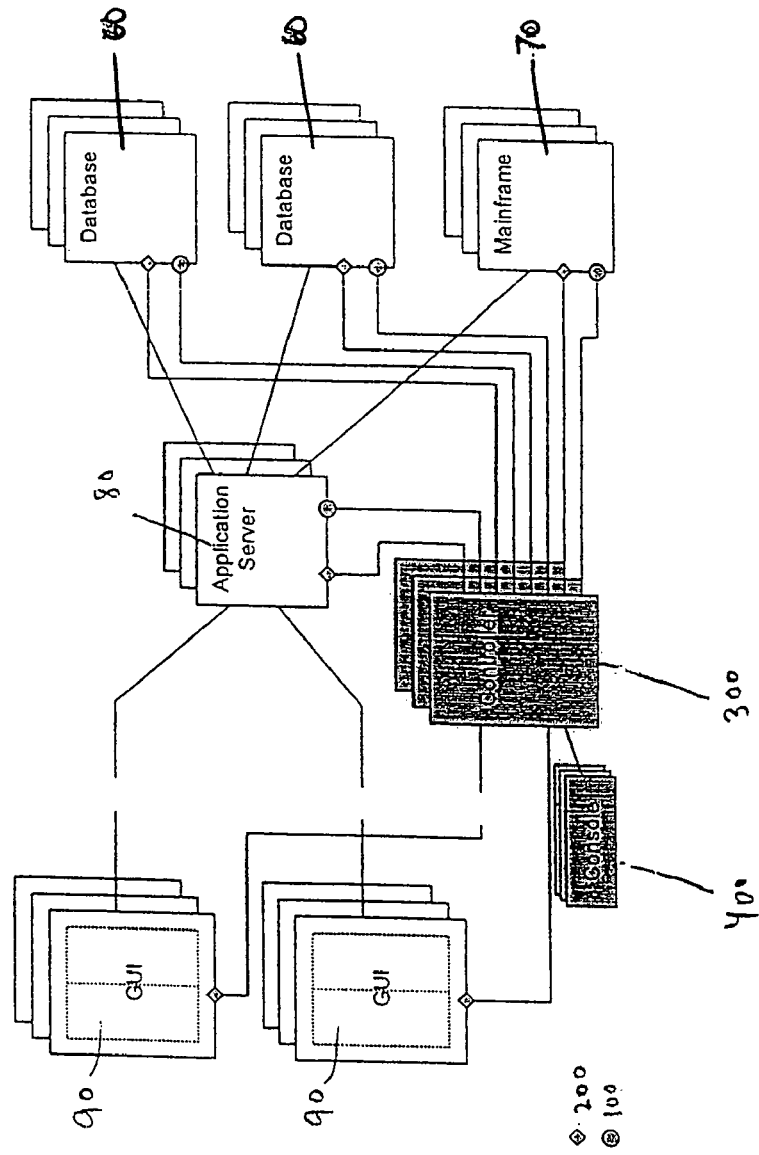
FIG. 13 shows another example of an application wherein not all elements of the invention are implemented.

Sensors 100, controllers 300, actuators 200, and consoles 100 may be separate elements that interact using some communications mechanism or may be implemented in a single unit 600, as depicted in FIG. 11. There may be components of the application that do not have sensors or actuators; in a web application, for example, there may not be sensors or actuators in the web browser, as depicted in FIG. 12. A multi-tier client/server application may have actuators, but no sensors, in the GUI, as shown in FIG. 13.

Sensors (100)

Sensors 100 measure the state, in particular the performance and availability, of the components of the system, potentially including both clients and servers.

Figure 14:
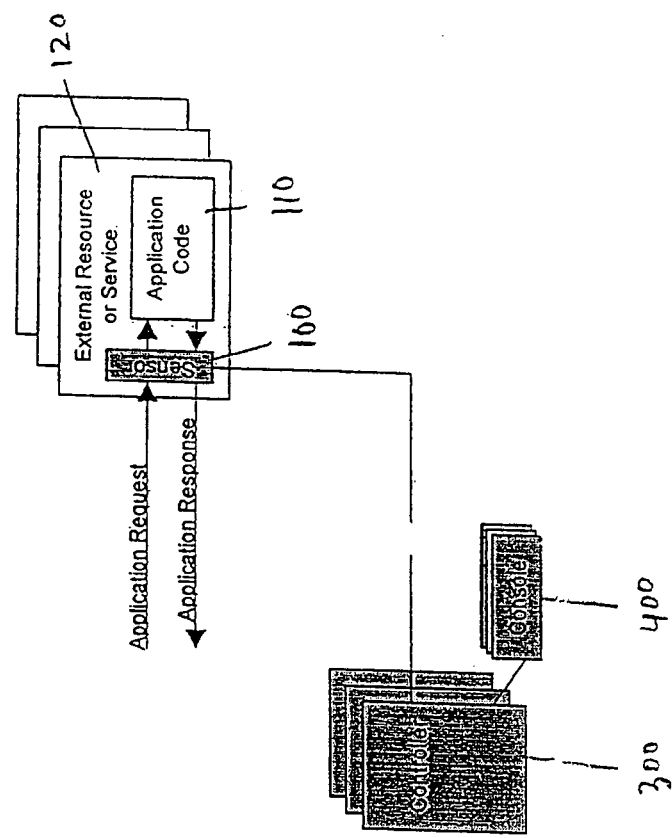
FIG. 14 shows components of the system of the current invention embedded directly in application code.
Figure 15:
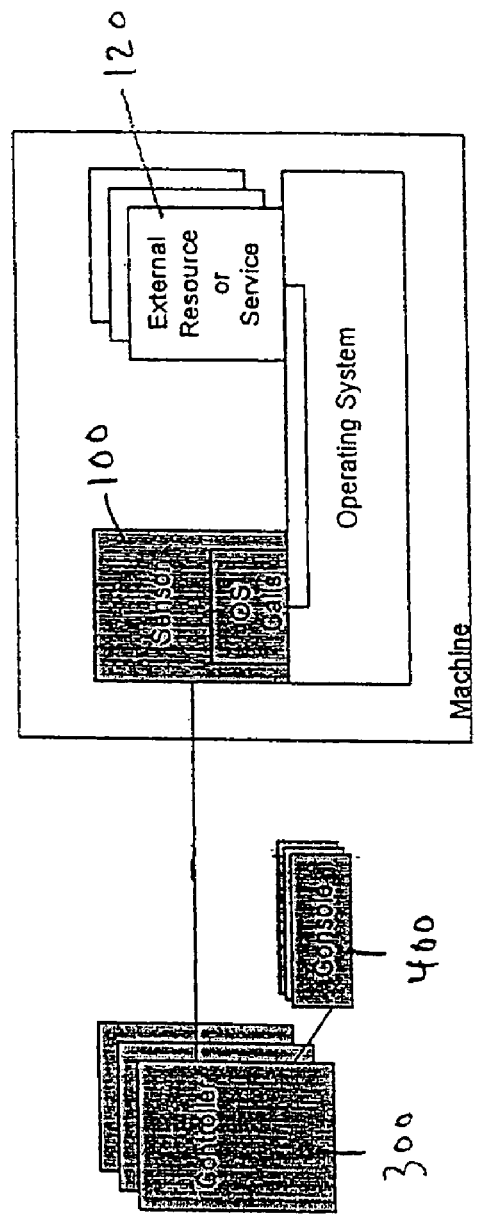
FIG. 15 shows an alternative embodiment of the invention wherein components of the current invention are using operating system calls within the application.
Figure 16:
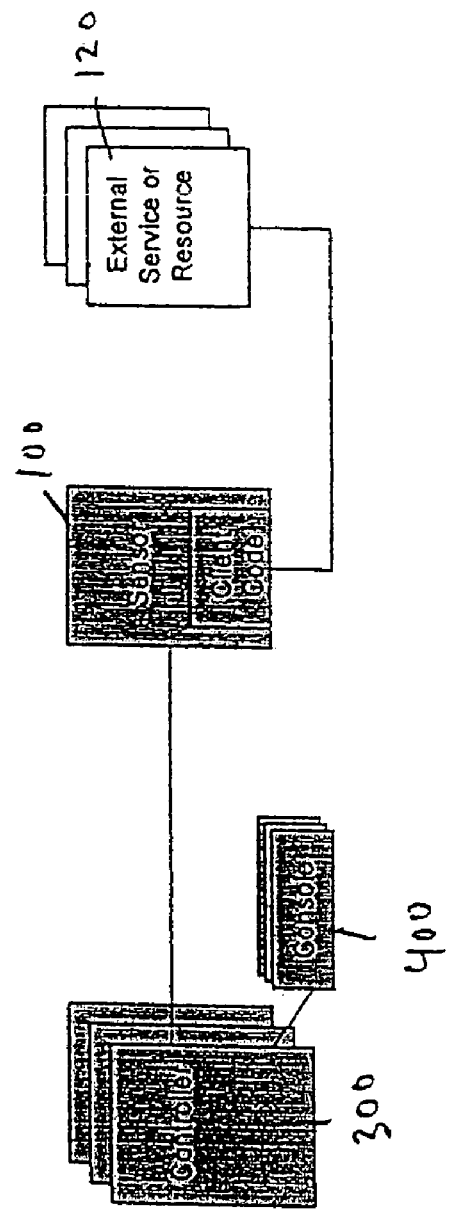
FIG. 16 shows yet another implementation of the current invention wherein certain components of the current invention are installed onto the network and acting as a client.
Figure 17:
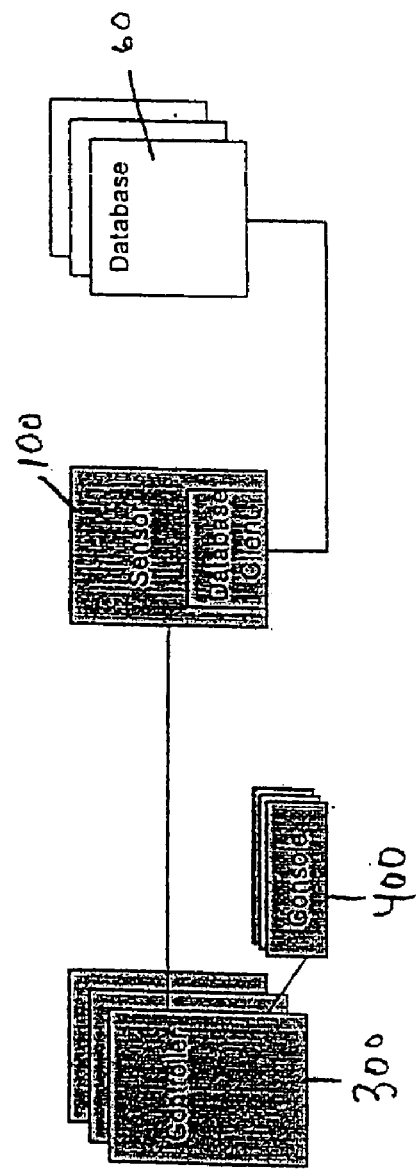
FIG. 17 shows yet another embodiment of the invention wherein components of the current invention are accessing a database server as a client.
Figure 18:
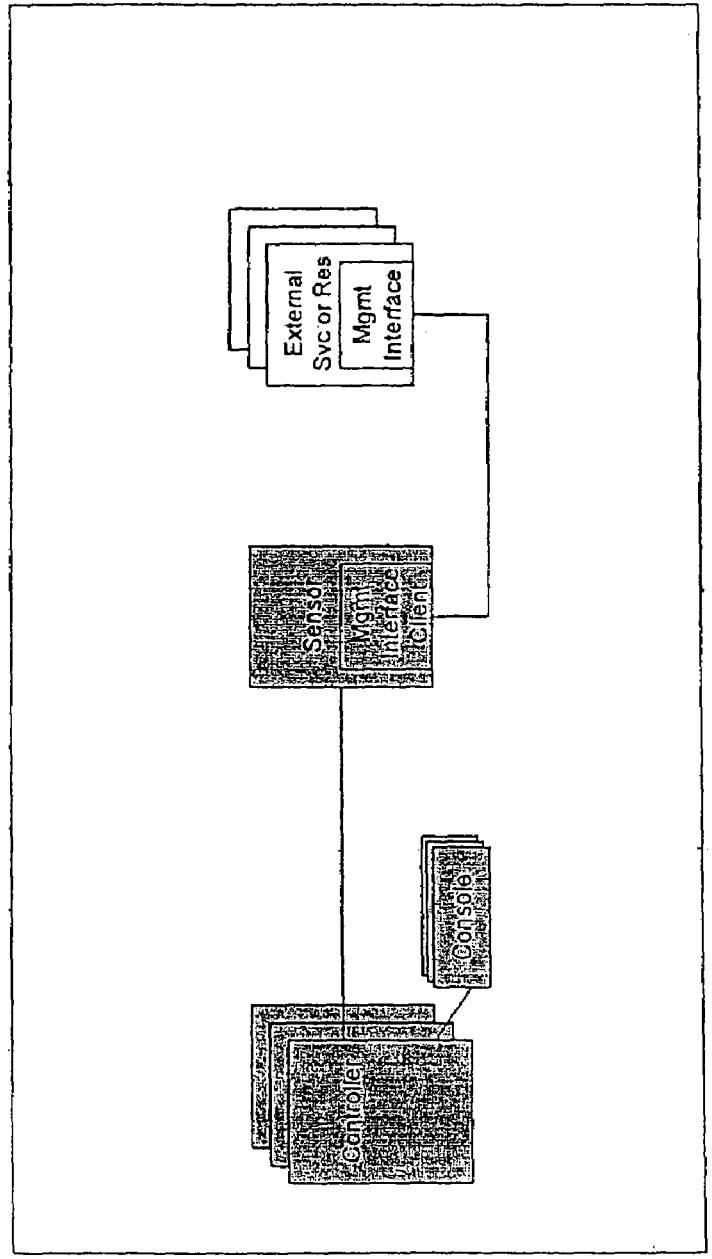
FIG. 18 shows yet another embodiment of the invention wherein components of the current invention are accessing a management interface.
Figure 19:
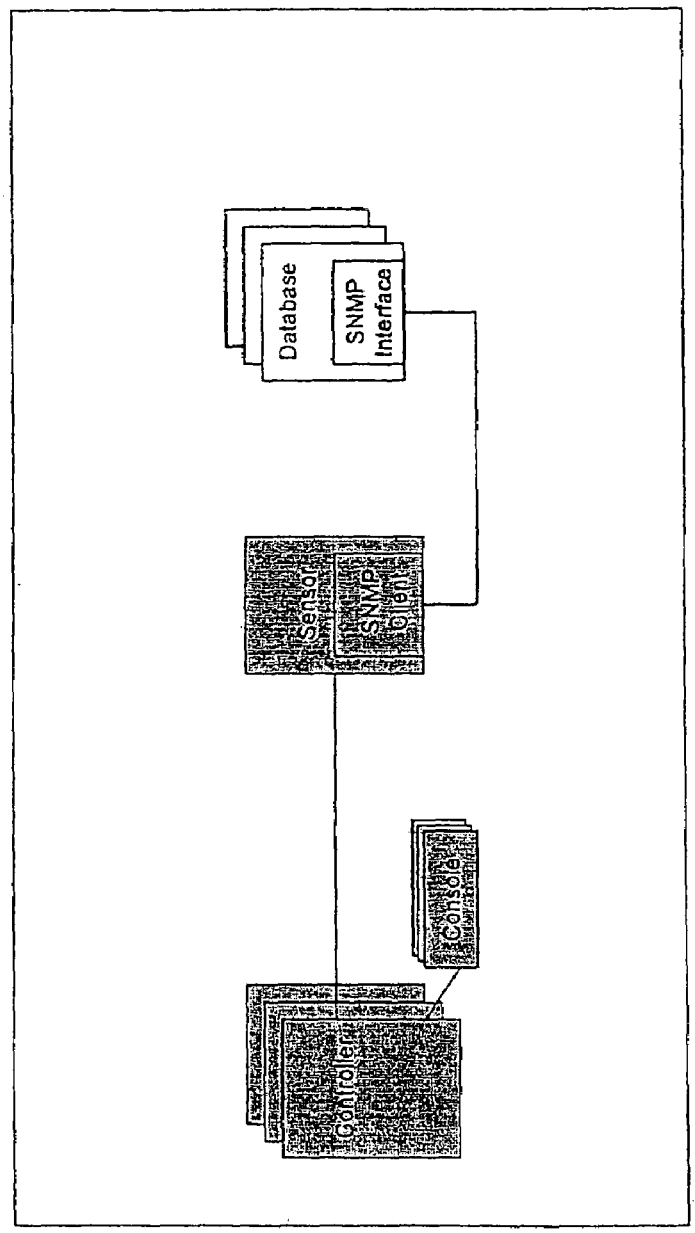
FIG. 19 is yet another embodiment of the current invention where system components are accessing the application via an SNMP interface.

Sensors 100 may be located in various places throughout the system. They may, for example, be placed inside the user interface rendering mechanism (e.g. inside the web server in this example), on the network, or in or near the external resources or services. For example, sensor 100 may be:

- Embedded in application code 110 of external resource or service 120 and monitoring by directly measuring application response time and availability, as shown in FIG. 14.
- Installed on the same machine as the external resource or service 120 and monitoring it through a monitoring interface or operating system function, as shown in FIG. 15. The sensor may use operating system calls to monitor that the process representing the external service or resource is running and track its utilization of operating system resources such as CPU, memory, disk space, and network communication.
- Installed on the network and monitoring the external resource or service 120 by accessing it as a client and measuring the response time and availability, as shown in FIG. 16. In a web or multi-tier client/server example, sensor 100 may be a small program that monitors the response time of database 60 by periodically requesting data from the database and measuring the time that it takes to respond, as shown in FIG. 17.
- Installed on the network and monitoring the external resource or service 120 by accessing a management interface, as shown in FIG. 18. In a web or multi-tier client/server example, this could be done through the use of an SNMP interface 62 on the database server, as depicted in FIG. 19.
- A single component (external resource or service, user interface presentation mechanism, or user interface rendering mechanism) may be monitored by more than one sensor.

Figure 1:
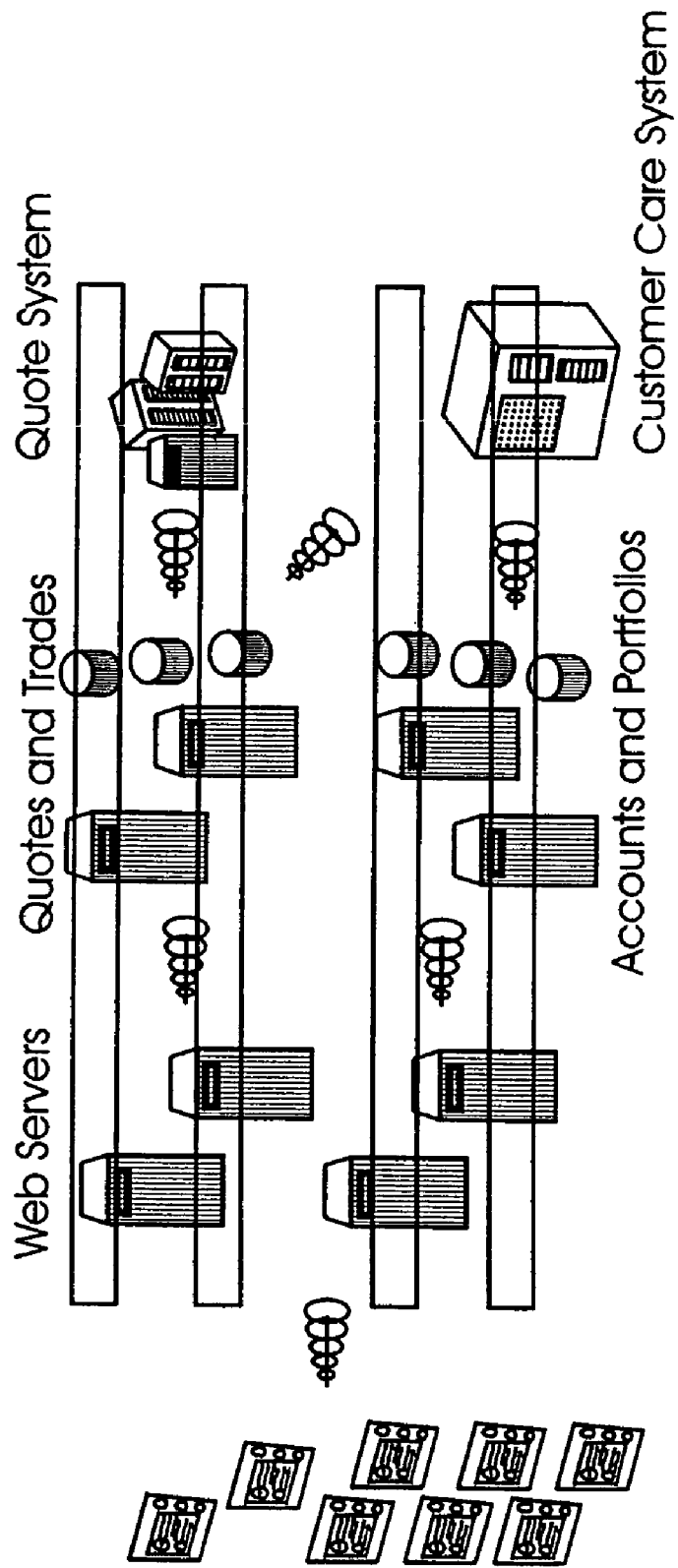
FIG. 1 shows a prior art equities trading application.
Figure 2:
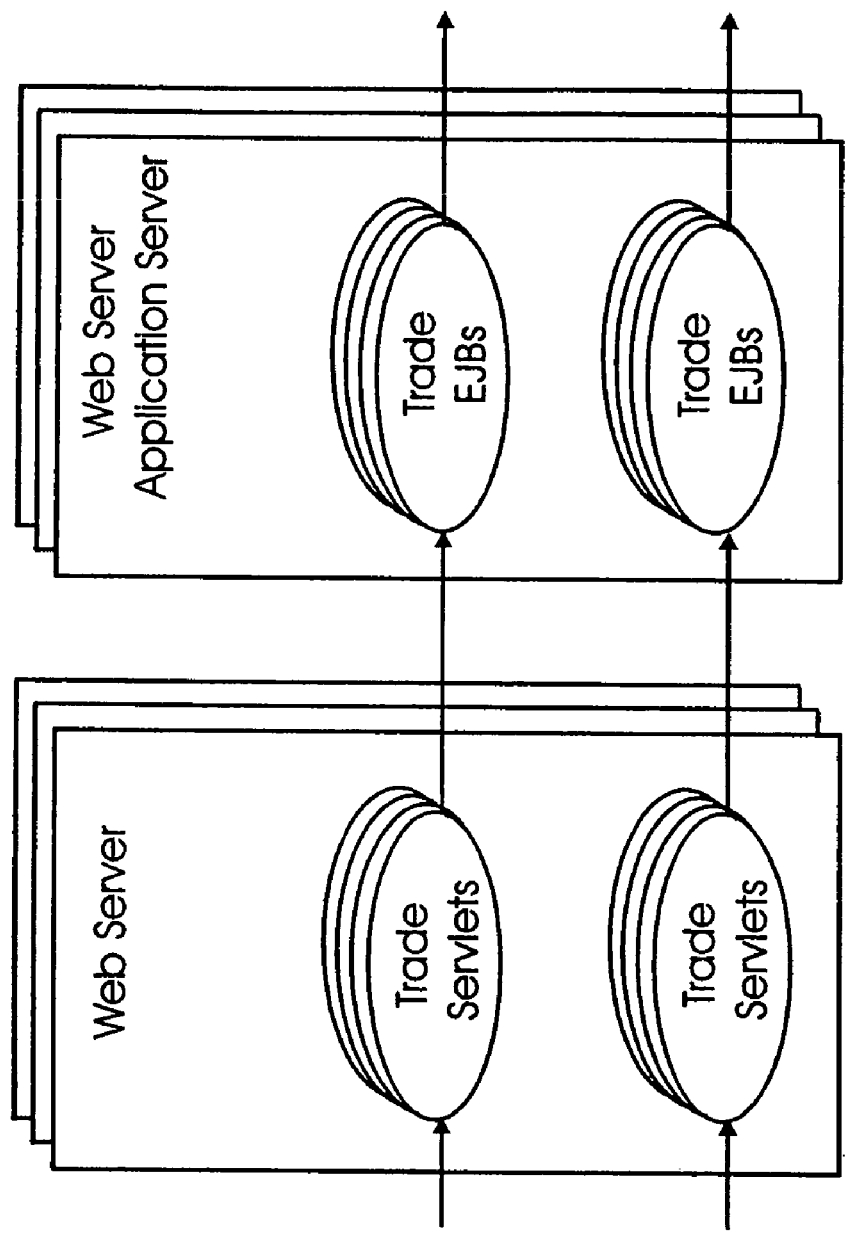
FIG. 2 shows a prior art Java servlet implementing a user interface to a trade function.
Figure 20:
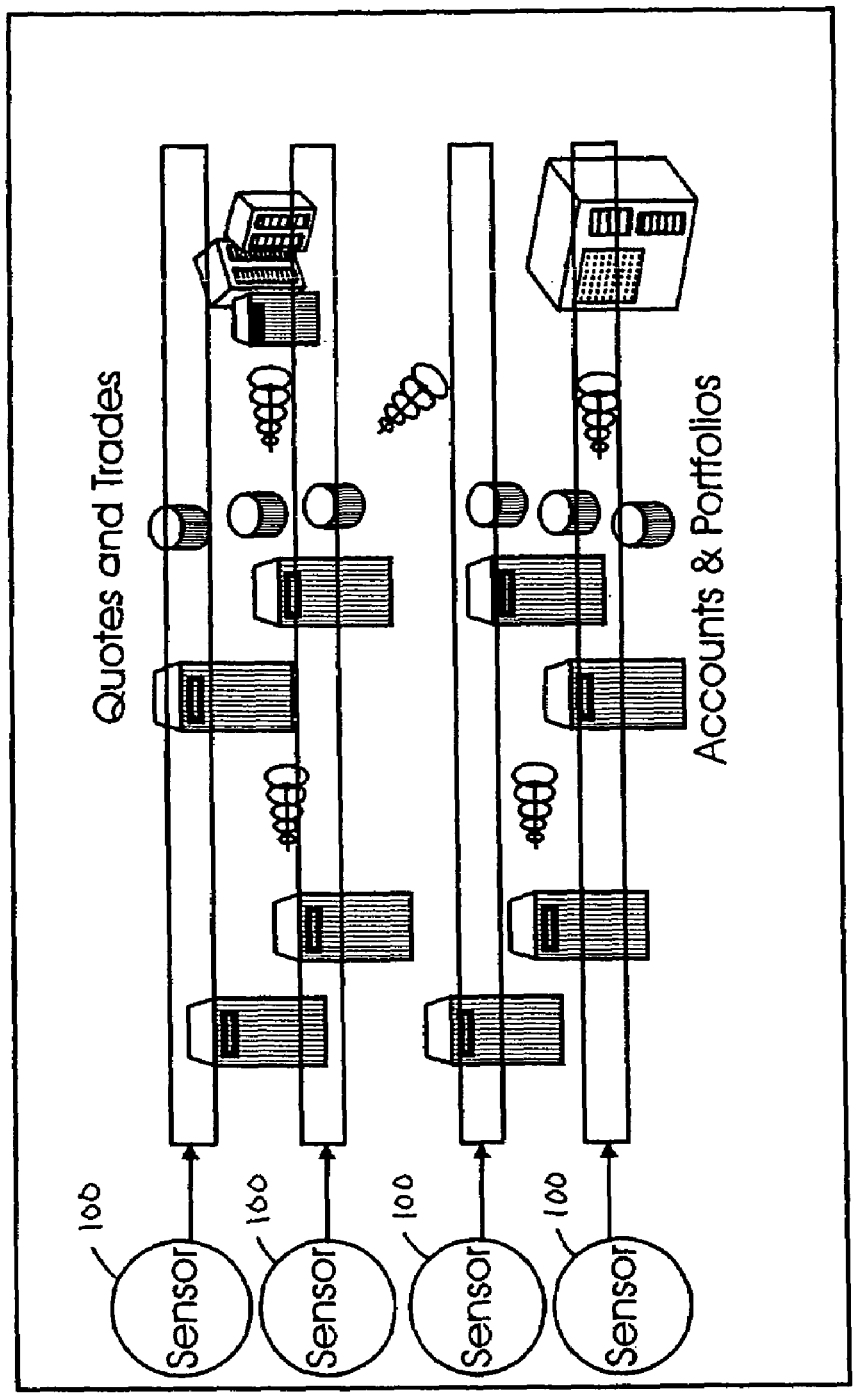
FIG. 20 shows a sample application involving a web brokerage service for stocks when certain components of the current invention are accessing the system via URL requests.
Figure 21:
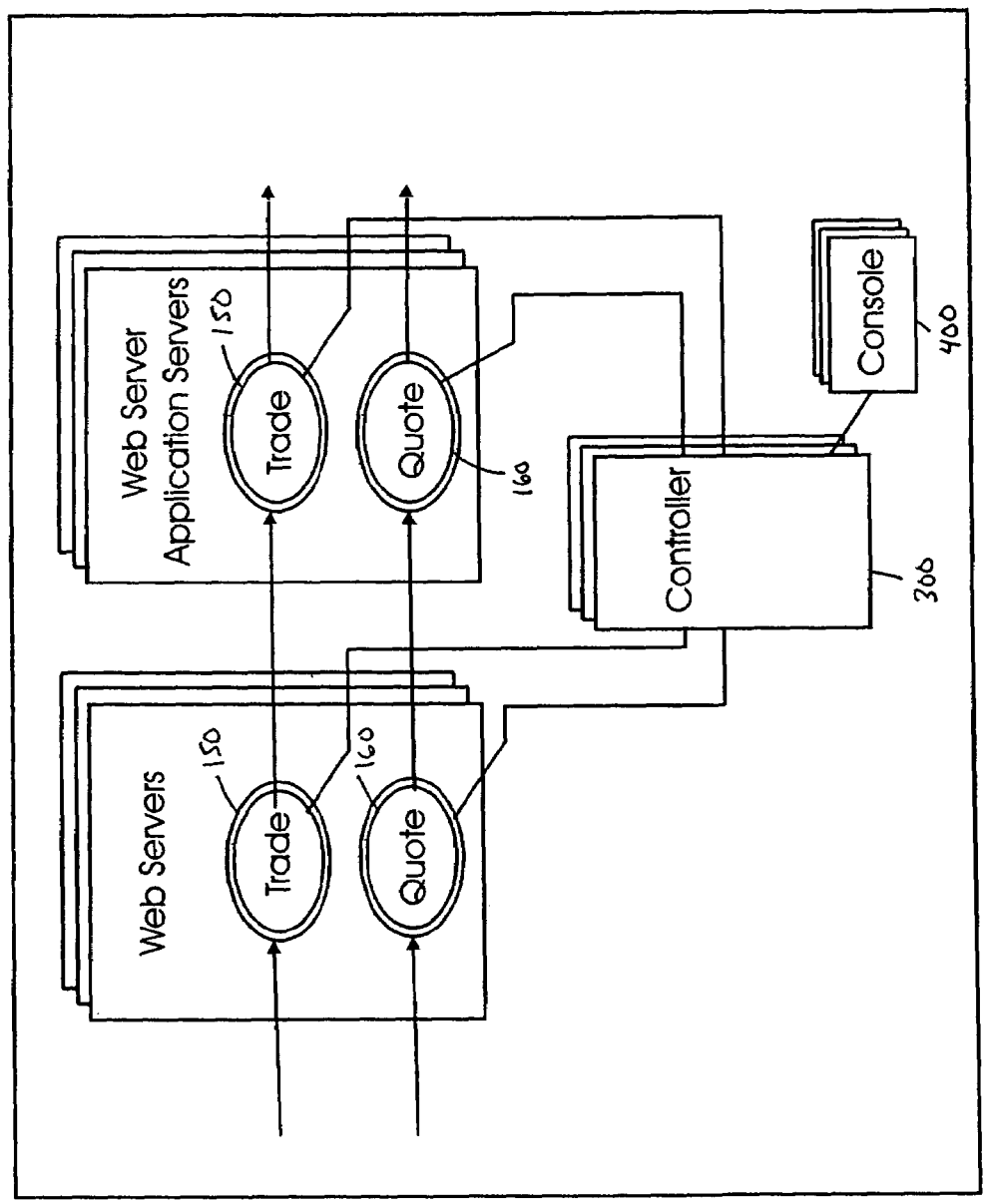
FIG. 21 shows the stock trading application shown in FIG. 20 having certain components of the current invention embedded in the application code.

There are several operating guidelines for sensors 100 that are of interest. These include:

- Sensors 100 may use existing performance and availability information, e.g. that collected by an existing performance monitoring mechanism; information collected from sensors 100 specifically deployed for the purposes of implementing graceful degradation; or both.
- Sensors 100 may monitor for or explicitly request input from an operator or other human user of the system.
- Some of sensors 100 may monitor or include information about the high-level application. For example, in a web brokerage comprising a web server and an application server which implements stock quotes and trades, as shown in FIG. 1, the sensors may monitor the performance and availability of the quote function. This can be implemented either by directly making functional requests (e.g. calling the appropriate URL in the web example), as shown in FIG. 20, or by inserting code into the components and objects that implement high-level quote function to directly report on their status and performance, as shown in FIG. 21. Note that this inserted code may be distinct from management interfaces offered by the component running the application-level code.
- The system may generate sensors 100 from the application-level code. For example, the system may implement a sensor-generator that can take application-level code written in Java and insert invocations to sensor methods. Such sensors 100 are particularly useful for deriving the state of a higher-level application.
- Sensors 100 may communicate directly with a controller, or they may log information in a local memory buffer, the contents of which sensor 100 sends to controller 300 either periodically, upon request, or both.
- Controller 300 may interact with sensors 100 to affect their behavior, e.g. change how frequently or what type of information they collect, or how they process or report the information to controller 300.

Controller (300)

The system contains one or more controllers 300 which take the input provided by sensors 100 and determine whether a given component is available and providing acceptable performance. Based on this information controller 300 sends messages to actuators 200. This determination is done using user-specified rules. For example, the trade function may be considered down if its response time is greater than ten seconds. Controller 300 may also simply send messages to another controller 300 (for example, in a large system, a hierarchical network of controllers 300 may be used).

Figure 22:
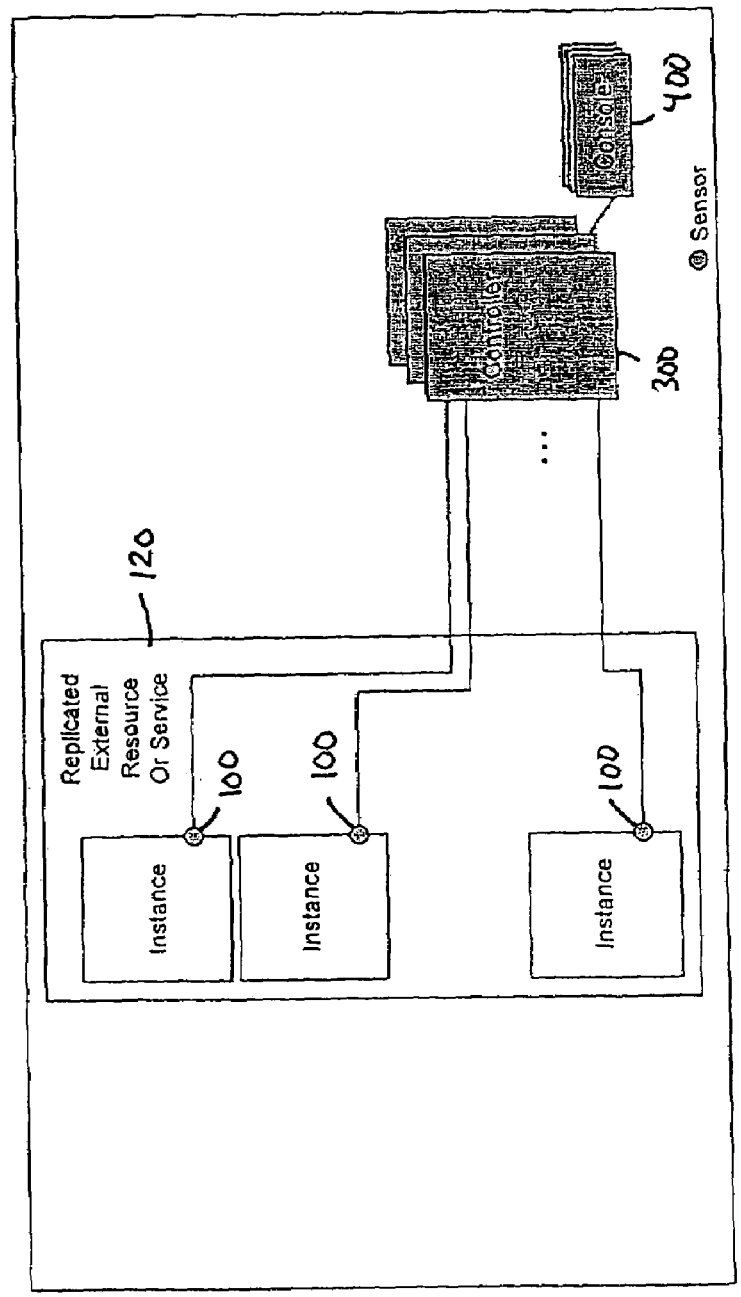
FIG. 22 shows multi instances of external resources or services which are being tracked by components of the current invention.
Figure 23:
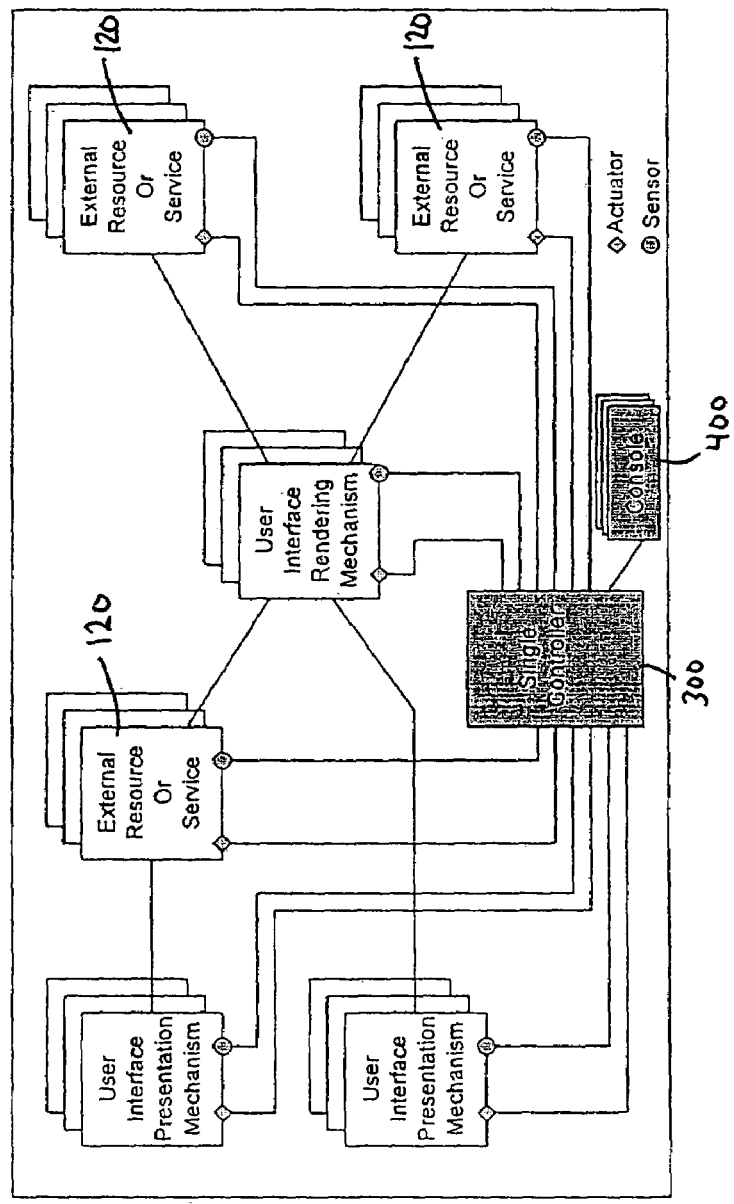
FIG. 23 shows the use of a single controller component of the current invention.
Figure 24:
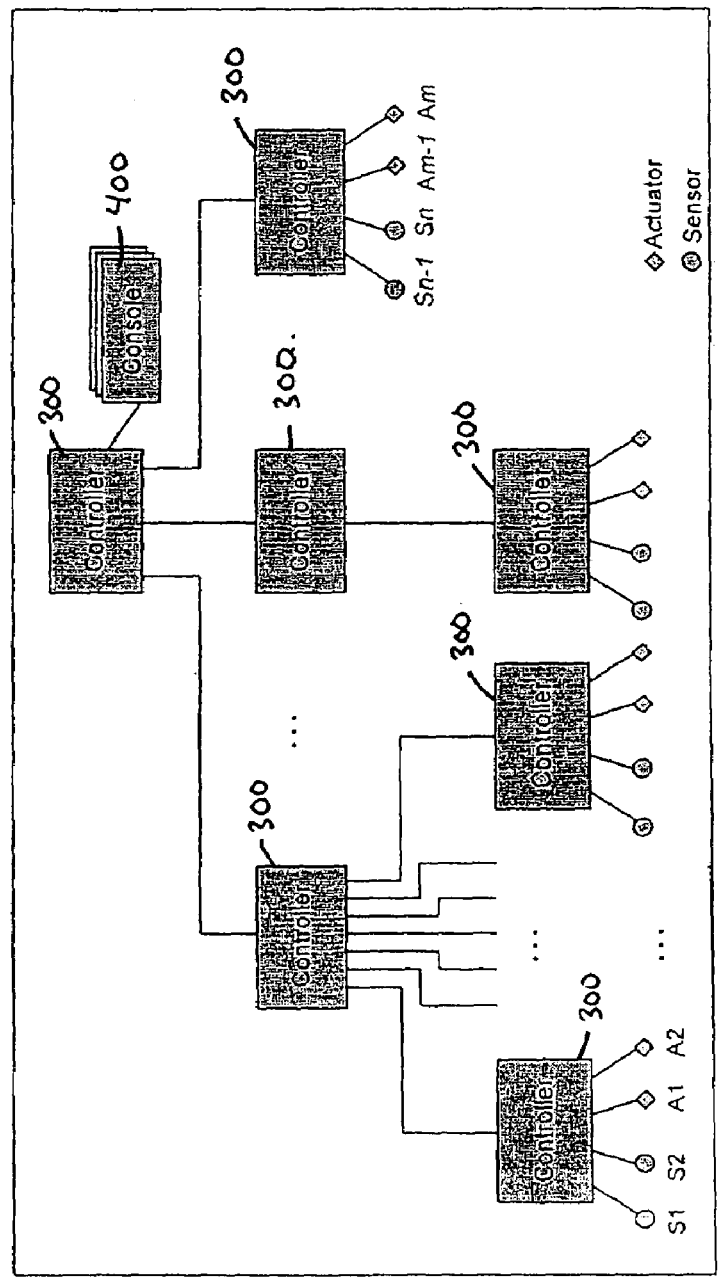
FIG. 24 shows an alternate embodiment of the current invention having multiple controllers arranged in a hierarchy.
Figure 25:
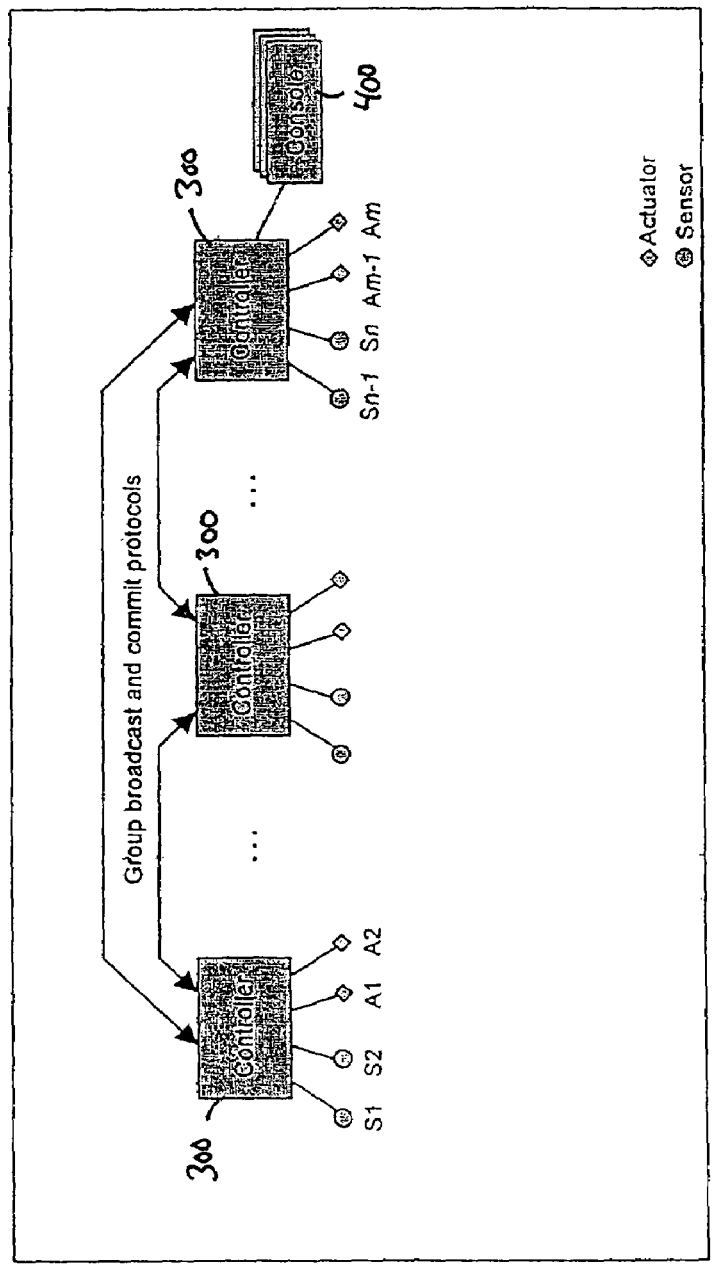
FIG. 25 shows yet another embodiment of the invention wherein the controllers are arranged in a process group.

The following guidelines with respect to controllers 300 are of interest:

- The state of any sub-application or function may be determined based on combining the input of more than one sensor 100. For example, an application may be considered down if either the database or the web application server is down.
- In cases where an external resource or service is replicated for performance or availability, controller 300 may track the state of individual instances of the external resource or service 120, and be able to apply metrics or algorithms defined by the operator of the system that use states of the instances of that external resource or service 120 to determine the state of the overall external resource or service 120, as shown in FIG. 22. For example, external resource or service 120 may be determined to be unavailable if the average response time across all of the instances drops below a preset value.
- To maintain consistent application behavior across components in a multi-component application, it is highly desirable to have a single view of the "state of the application", such that various actuators 200 in the system can be driven in a consistent fashion. There are several ways to achieve this. The simplest is to use a single controller 300, as depicted in FIG. 23. A second is to organize controllers in a master-slave hierarchy, as shown in FIG. 24, so that all sensor instrumentation flows eventually to one controller 300, which decides the "state of the application" and then sends messages to actuators 200, either directly or through the master-slave hierarchy. A third way is to organize controllers 300 in a 'process group' and use group broadcast and commit protocols to ensure consistent state, as shown in FIG. 25.

In many applications, controller 300 should implement "hysteresis" in changing its determination of the state of an application or sub-application or function, to prevent rapid oscillations in that state. For example, if the threshold for determining that an application is unavailable is that its response time rises above 10 seconds, the controller may wait until the response time returns to below 5 seconds before determining that the application is again available.

Figure 26:
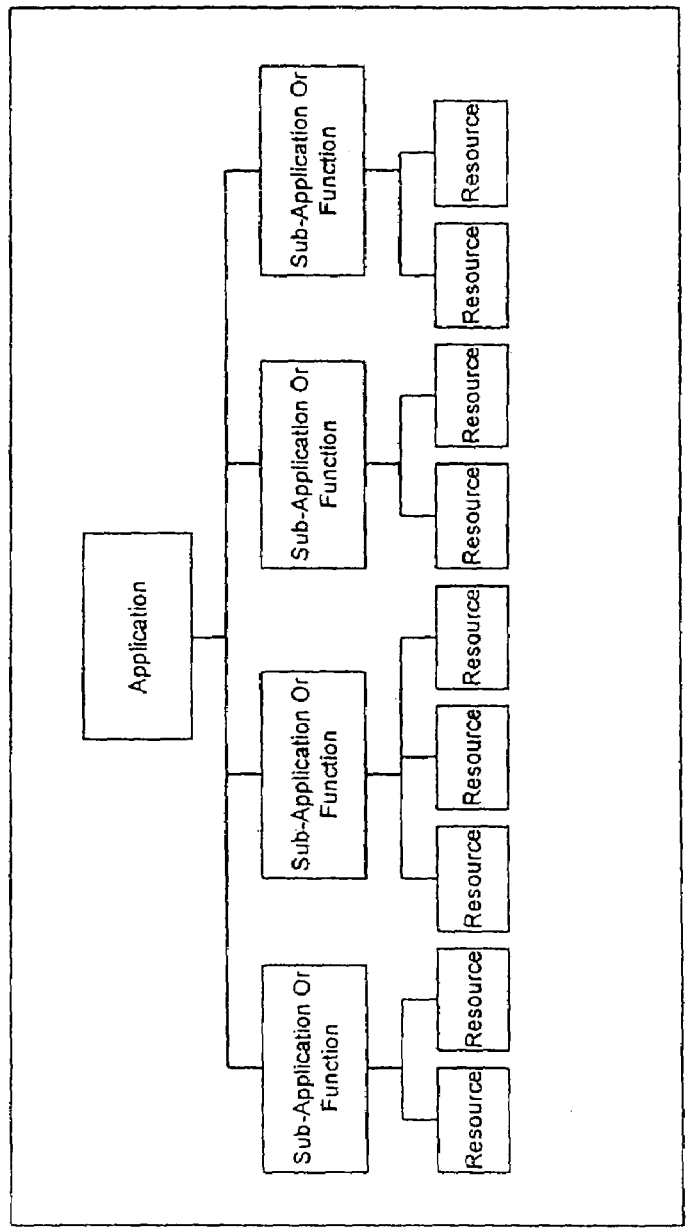
FIG. 26 shows an application level view modeled as a hierarchy of components wherein the high level view of the application is composed of multiple subcomponents.
Figure 27:
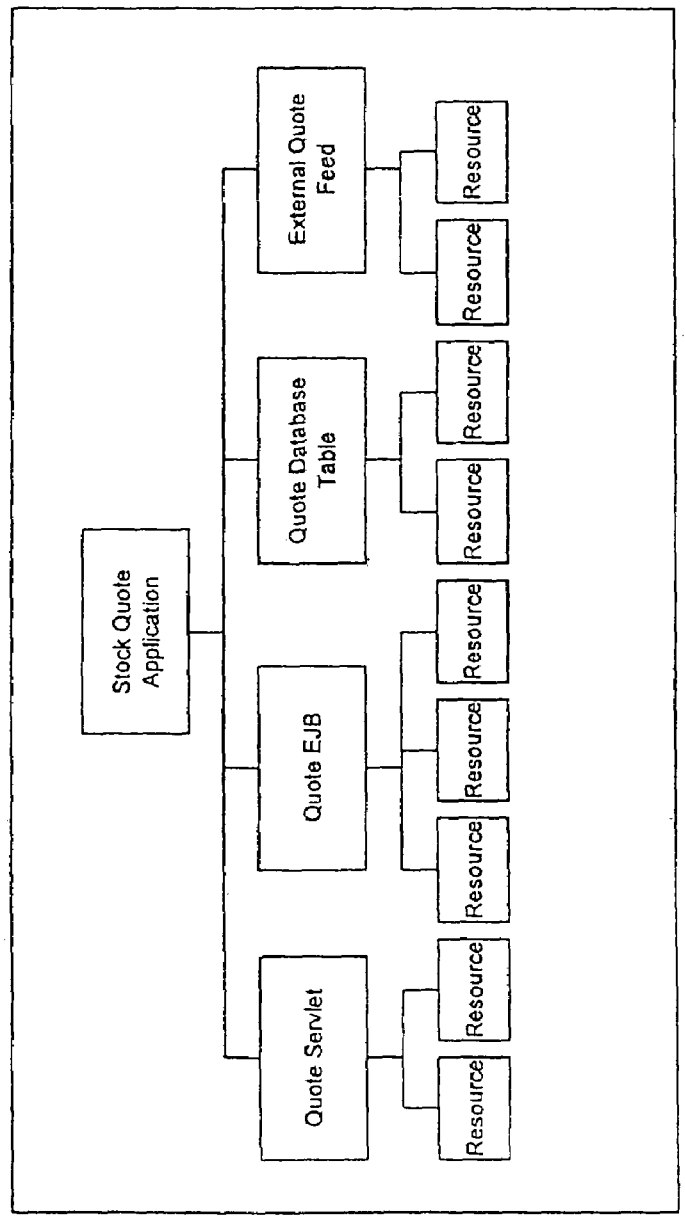
FIG. 27 shows another embodiment of the invention wherein the application level view of the application is implemented as a hierarchical view as applied to the web application example.
Figure 28:
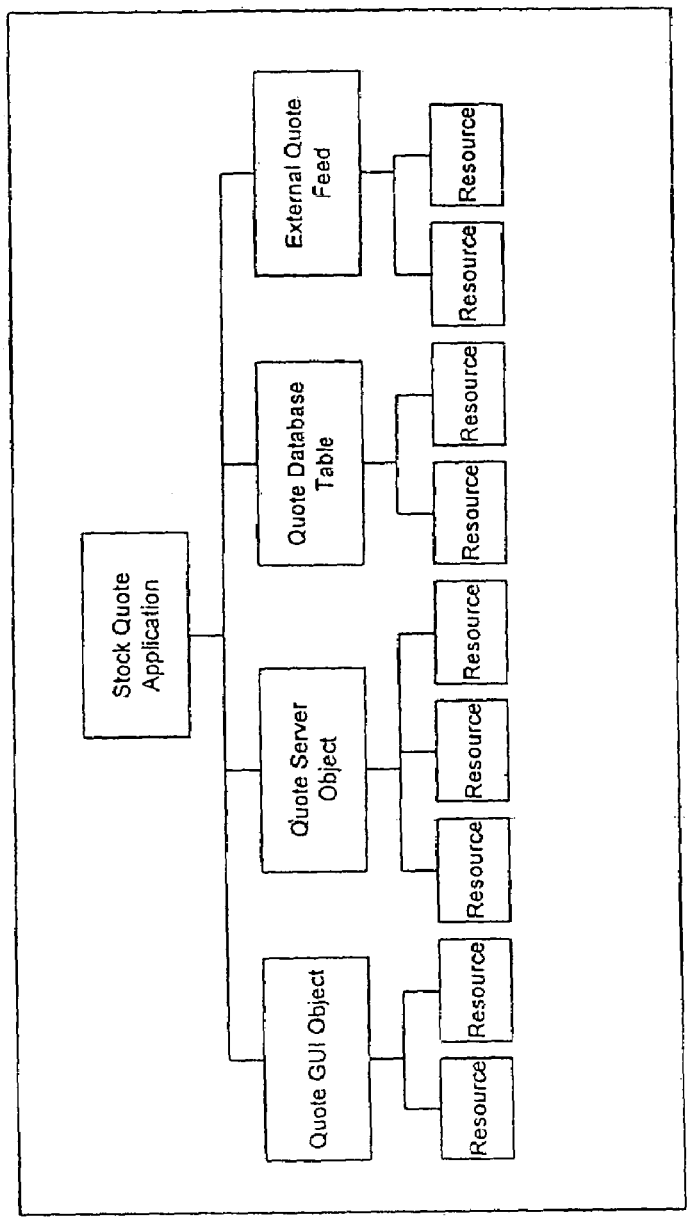
FIG. 28 shows the application level view as applied to a multi-tiered client/server application.

Controller 300 may maintain an application-level view (ALV)—a comprehensive view of the state of an application. The ALV may include both the state of the high-level business functions or sub-applications, as well as the state of the external resources or services. This view may be modeled as a hierarchy of components in which a high-level view of the application is composed of multiple sub-components, as shown in FIG. 26. This hierarchical view as applied to the web application example is shown in FIG. 27, and as applied to a multi-tier client/server application in FIG. 28.

Console (400)

The system may contain zero, one, or several consoles 400, and more than one console 400 may be in use concurrently. This is the mechanism by which the operator of the system can view and control the state of the system. Console 400 may be graphical or command-line based, and may use a web browser. Console 400 may communicate directly with the various sensors 100 and actuators 200, or for scalability reasons, may do so indirectly through the control center. Console 400 provides a number of functions including, but not limited to, configuring the system, controlling the activity of the system, such as enabling/disabling sensors 100, viewing the readings from sensors 100 and the ALV and displaying messages and alerts generated by the system, such as notification of the graceful degradation of the application.

Actuators (200)

The system contains one or more actuators 200 which change the behavior of the application under the control of controller 300 based on state of the application as determined by controller 300. Actuators can be implemented using a variety of mechanisms, and may or may not require explicit changes to the application in order to allow the application's behavior to be changed in response to the actuator.

Actuators 200 may affect the behavior of an entire application, or may affect only a sub-application or function of an application to allow the behavior of one or more sub-applications or functions to be changed without affecting other sub-applications or functions.

Figure 29:
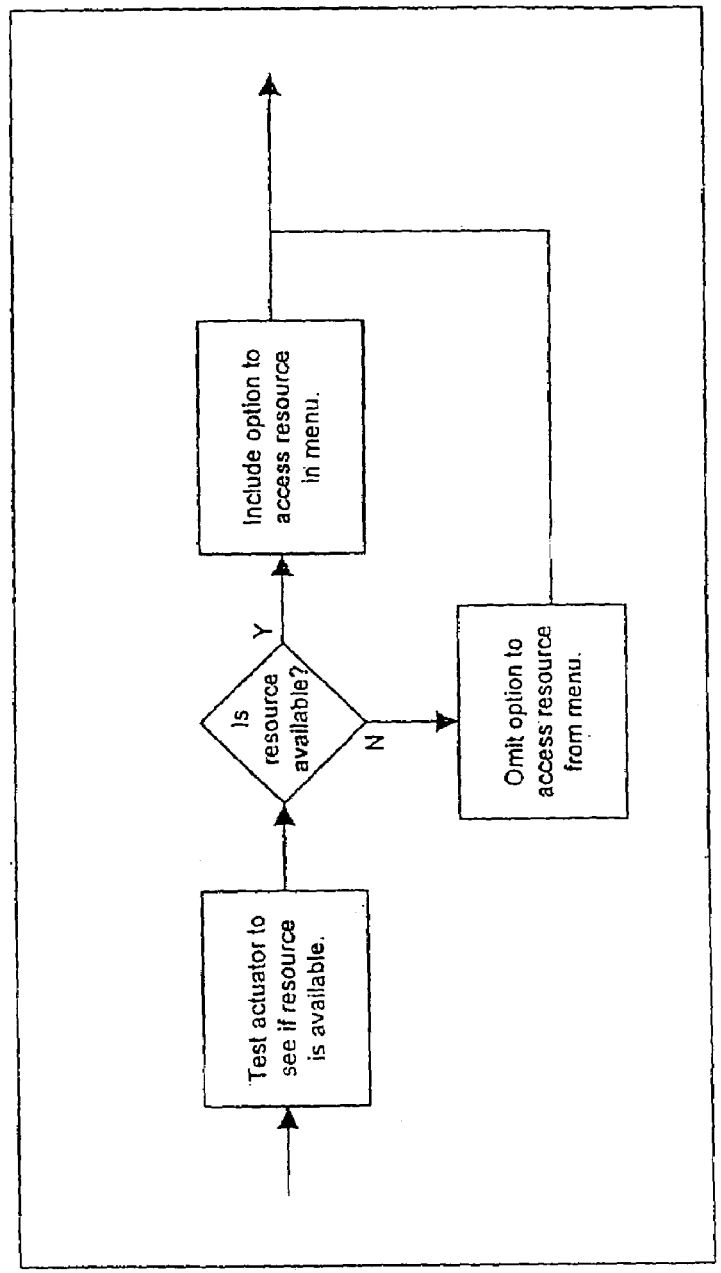
FIG. 29 shows the flow chart of an implementation of a sensor according to the current invention.

The ability to change the behavior of an application based on the action of actuator 200 may need to be partially implemented in the application code. For example, an if-then test of a variable controlled by actuator 200 may need to be added to the application in order to check whether external service or resource 120 is available before offering the user the option to access that service or resource, as shown in FIG. 29. For an HTML web page dynamically generated by a Java Server Page, for example, the Java code may test an attribute set by actuator 200 and either include or exclude a link to a particular service based on the value of that attribute, as shown in FIG. 30. FIG. 31 shows a similar example for a VisualBasic GUI to a multi-tier client/server application.

Changes to the behavior of an application may not require explicit implementation in the application code. For example, actuator 200 may compose a plug-in to a web server which causes low-resolution graphics files to be substituted for high-resolution graphics files that would be used normally in the event that a content routing and distribution mechanism (e.g. Akamai) failed.

Figure 32:
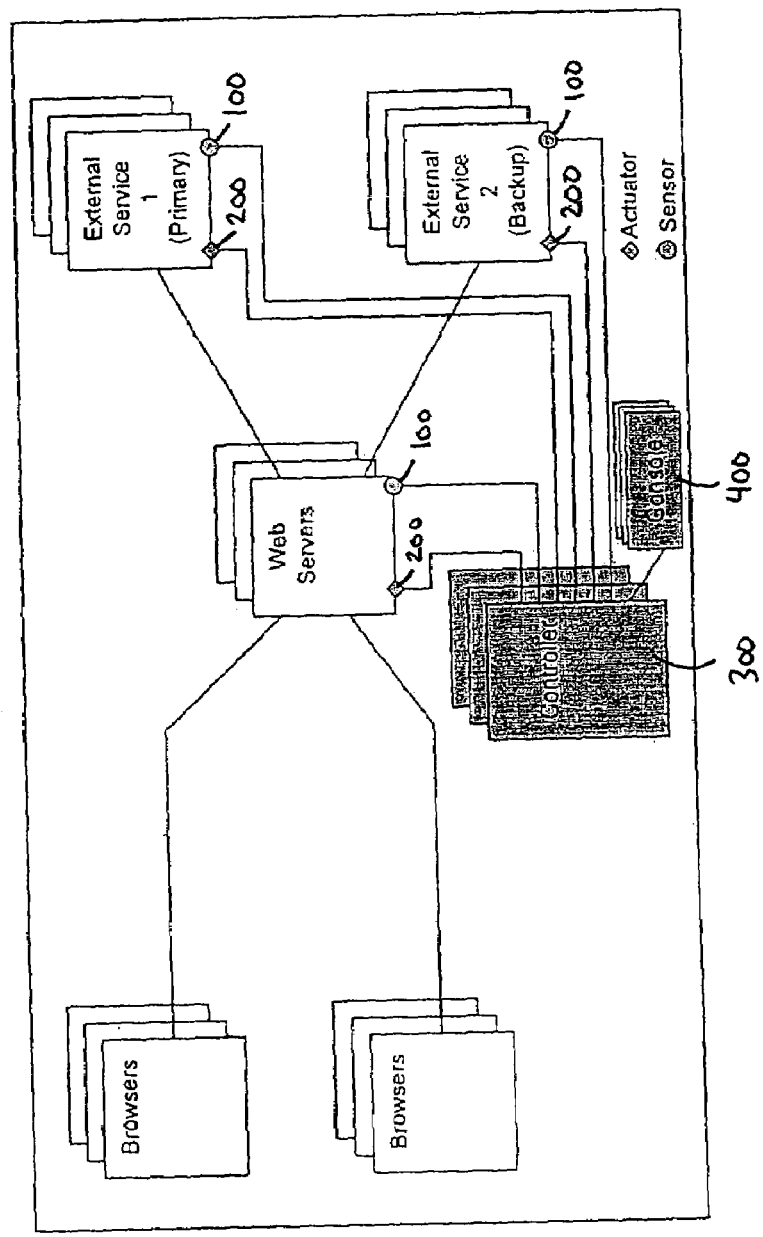
FIG. 32 shows the use of multiple actuators to modify the behavior of the application.

Multiple actuators 200 may be used to modify the behavior of an application in more than one place in the system concurrently. Ideally, in order to maintain consistent application behavior, actuators 200 should be driven from a single, consistent view of the state of the application, as described above. For example, as shown in FIG. 32, actuator 200 may be in a web server that changes an HTML page that points to a service that is unavailable to point to a new service that offers comparable functionality; a second actuator 200 may enable and configure the new service.

Figure 33:
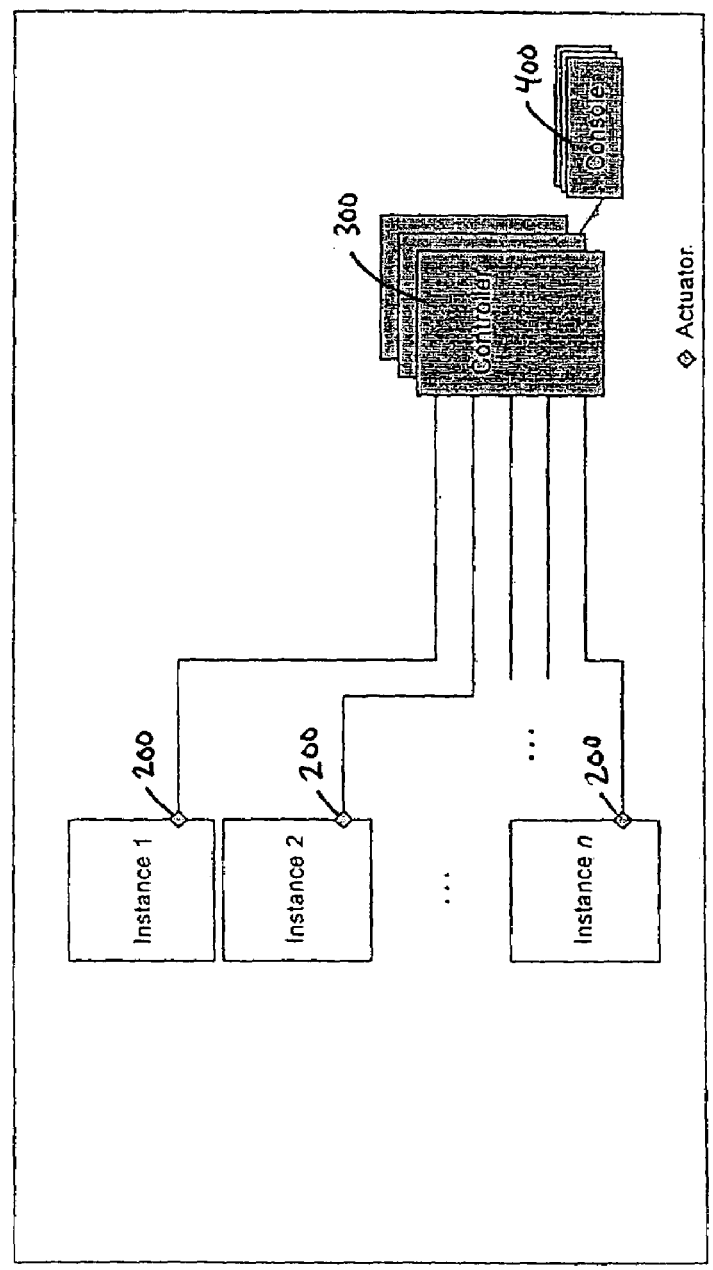
FIG. 33 shows multiple instances of actuators deployed across replicated instances of a user interface rendering mechanism.

Multiple instances of actuator 200 may be deployed across replicated instances of a user interface rendering mechanism or other external resource or service, as shown FIG. 33. Again, it is desirable for actuators 200 to be driven from a single consistent view of the state of the application to maintain consistent behavior across the replicated instances.

Figure 34:
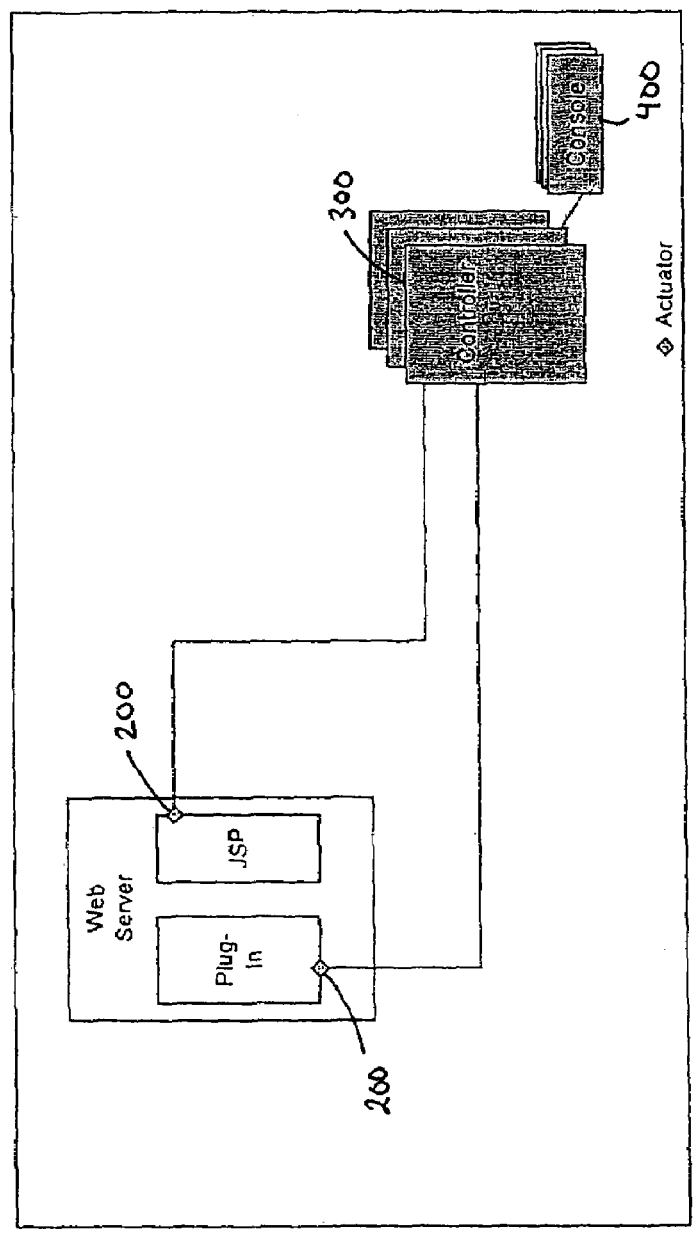
FIG. 34 shows a single component of the application being affected by multiple actuators.

A single component (external resource or service, user interface presentation mechanism, or user interface rendering mechanism) may be affected by more than one actuator 200. For example, as shown in FIG. 34, the behavior of a web server may be affected by both a plug-in to allow switching to low-resolution graphics, and code in a servlet or Java Server Page which changes its behavior based on the state of each actuator 200.

Operation

The manner in which the system is deployed and operated will now be described. Before the system is put into operation, sensors 100 are installed and configured to monitor the appropriate components of the application and to communicate with the controller(2) 300. Next, controller(s) 300 are configured with rules for determining the state of the application based on the inputs from sensors 100, and for controlling actuators 200 based on this state. Actuators 200 are installed and configured to communicate with controller(s) 300. Changes to the application may be implemented to allow its behavior to be controlled by actuators 200.

The system would then be put into operation. As the application executes, sensors 100 track the performance and availability of the monitored components, and report this data to controller 300. Controller 300 applies the rules to the sensor data to generate the state of the application, and to control actuators 200.

Figure 35:
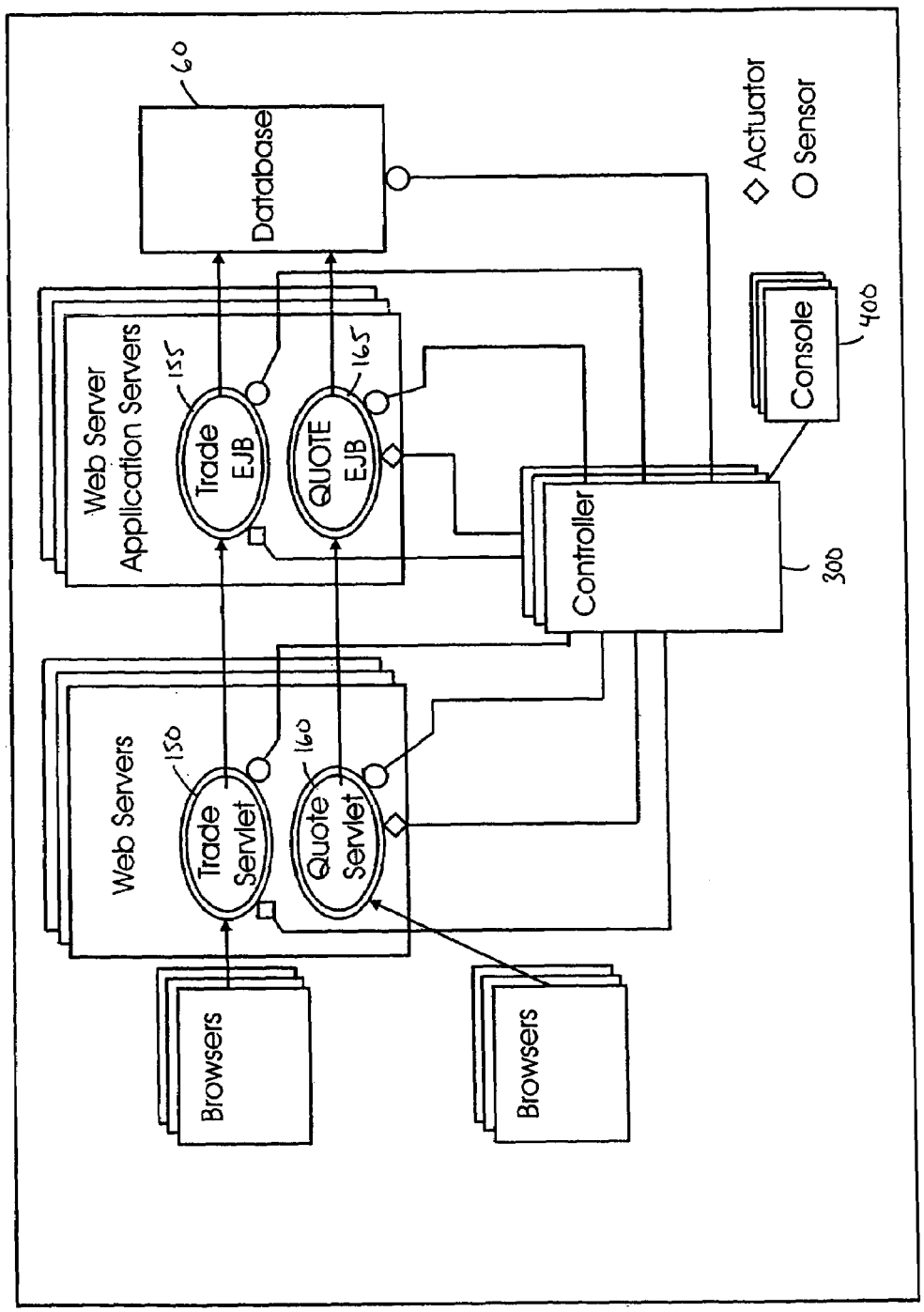
FIG. 35 is an example of a web equities trading example implemented as a web application.

In the web equities trading example shown in FIG. 35, sensors 100 would be added to the quote and trade servlets 160 and 150 respectively, and quote and trade EJBs 155 and 165 respectively, and configured to talk with controller 300. Controller 300 would be configured with rules that determine the state which indicates that the quote and trade functions are operating normally and to control actuators 200 based on that state. For example, the state of the trade function would be down if the response time of the trade EJB 155 were greater than 5 seconds or if database 50 were down. Actuators 200 would be installed in the web server and web application server and configured to communicate with the controller 300. Trade servlet 150 would be modified to test the state of the trade function via actuator 200 before attempting to invoke trade EJB 155, and to return an error message to the user if the trade function were unavailable.

Figure 36:
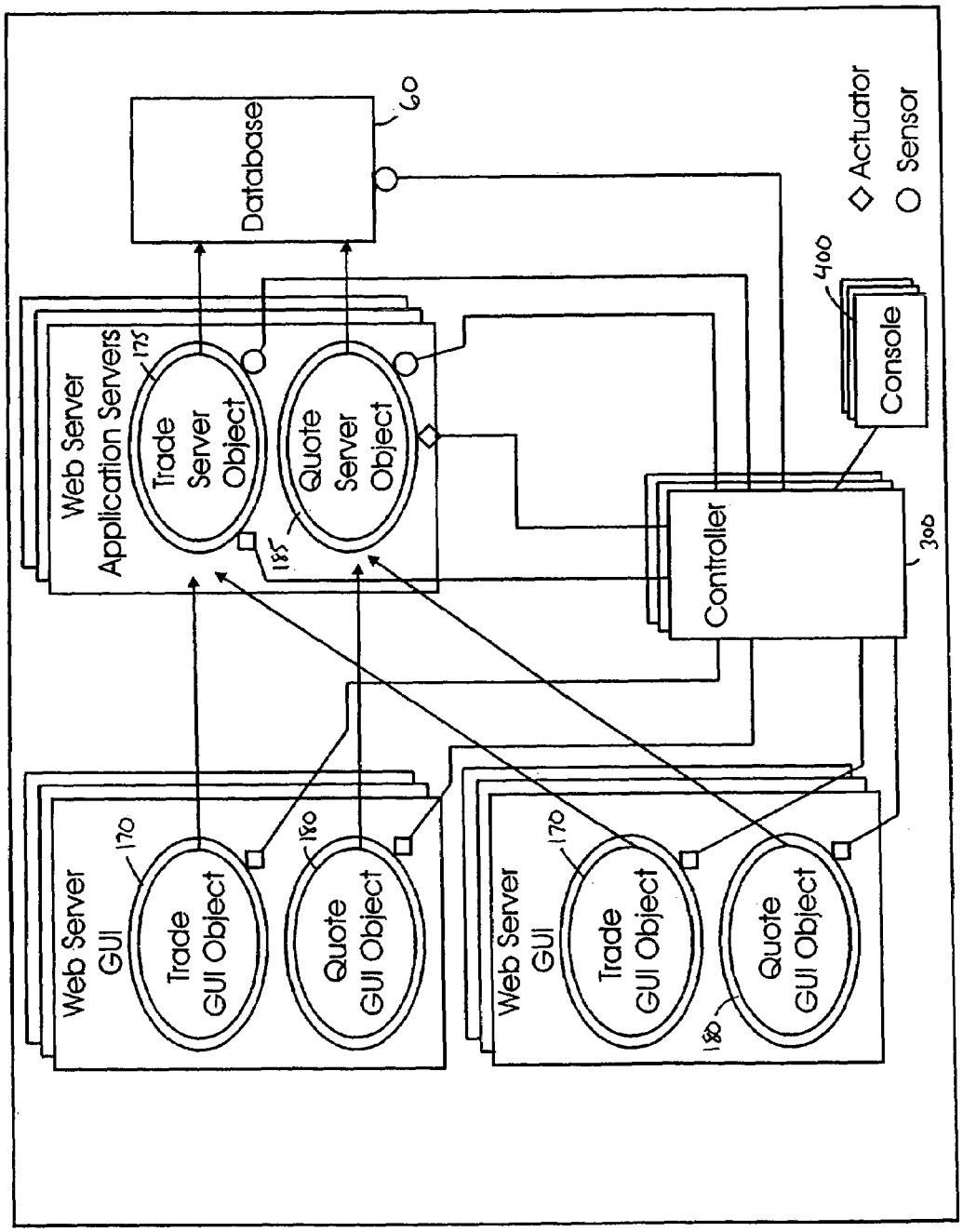
FIG. 36 shows the application of FIG. 35 implemented as a multi-tiered client/server model.

In the multi-tier client/server equities trading example shown in FIG. 36, sensors 100 would be added to the trade and quote graphical user interface objects and the trade and quote server objects 170, 180, 175 and 185 respectively, and configured to talk with controller 300. Controller 300 would be configured with rules that determine if the current state indicates that the quote and trade functions are operating normally and to control actuators 200 based on that state. For example, the state of the trade function would be down if the response time of the trade server object 175 were greater than 5 seconds or if database 60 were down. Actuators 200 would be installed in the application server and configured to communicate with the controller 300. The trade graphical user interface object 170 would be modified to test the state of the trade function via actuator 200 before attempting to invoke the trade server object 175, and to return an error message to the user if the trade function were unavailable.

The graceful degradation system can be used to modify the behavior of an application in a variety of ways, including but not limited to the following examples:

The system may simply be configured to detect failures in components and prevent users from accessing affected functions. In the web application in FIG. 35 or the multi-tier client/server application in FIG. 36, for example, the system may monitor the state of the quote and trade functions and prevent users from attempting to access these functions when they are down by removing or disabling the appropriate menu entries in the user interface.

The system may monitor load on an application and prevent users from accessing some functions when the load on the application is high, in order to ensure that resources are available to allow other functions to continue to operate. For example, if the load on the application is high, the graceful degradation system could be used to prevent users from accessing the quote function in order to ensure that there are enough resources to allow the trade function to operate with acceptable performance.

If information about the priority or class of the user is available in the application code (through the use of a log-in service or personalization mechanism, for example), the graceful degradation feature can be used to prevent low priority users from accessing certain functions during times of peak load. In the web example shown in FIG. 35, the quote servlet could be modified to allow only high priority users from accessing the quote function when the load on the application is high. In the multi-tier client/server example in FIG. 36, the quote graphical user interface object could be similarly modified. When the load on the application is acceptable, all users could be granted access to the quote function:

Although the invention described herein has been described in terms of specific examples, the scope of the invention is not meant to be limited thereby. The scope of the invention is embodied in the following claims.

What is claimed is:

1. A system for providing for the graceful degradation of the performance of a computer application, the system comprising:

at least one sensor configured to monitor an availability and/or performance of resources associated with the computer application;

a first controller and a second controller, the first controller configured to collect information from the at least one sensor and to apply rule-based criteria to the information to determine the availability and/or performance of the resources, the first controller further configured to generate at least one message to the second controller; and a plurality of actuators configured to modify a single component of the computer application based on the information collected by the first controller.

2. The system of claim 1, further comprising at least one console.

3. The system of claim 2, wherein the at least one console is configured to communicate with the at least one sensor.

4. The system of claim 3, wherein the at least one console is configured to communicate with the at least one sensor through at least one of the first and second controllers.

5. The system of claim 2, wherein the at least one console is configured to communicate with the plurality of actuators.

6. The system of claim 5, wherein the at least one console is configured to communicate with the plurality of actuators through at least one of the first and second controllers.

7. The system of claim 1, wherein the first and second controllers are arranged in a master/slave hierarchy.

8. The system of claim 1, wherein the computer application is a web-based application.

9. The system of claim 1, wherein the computer application is a multi-tiered client/server application.

10. A method for providing for the graceful degradation of the performance of a computer application, the method comprising:

receiving with a plurality of controllers data from at least one sensor, the data indicative of an availability and/or performance of resources associated with a computer application;

applying rule-based criteria to the data to determine the availability and/or performance of the resources;

generating at least one message with a first controller of the plurality of controllers to a second controller of the plurality of controllers, the message indicative of said determination;

instructing a plurality of actuators or at least one of the plurality of controllers to modify a behavior of the computer application based at least on said determination; and modifying a single component of the application with the plurality of actuators.

11. The method of claim 10, wherein said applying further includes determining a course of action based on the data received from the at least one sensor.

12. The method of claim 10, additionally comprising monitoring with a plurality of sensors the availability and/or performance of resources associated with the computer application.

13. The method of claim 12, wherein said monitoring comprises monitoring a single component of the application with the plurality of sensors.

14. The method of claim 12, wherein said monitoring includes monitoring performance characteristics identified by a user.

15. The method of claim 10, wherein the first controller and the second controller are arranged in a master/slave hierarchy.

16. The method of claim 10, additionally comprising modifying a behavior of the at least one sensor with at least one of the plurality of controllers.

17. The method of claim 10, additionally comprising receiving at least a portion of the rule-based criteria from a user.

18. A system for providing for the graceful degradation of the performance of a computer application, the system comprising:

means for monitoring an availability and/or performance of resources required by a computer application;

means for receiving information from the monitoring means and for applying rule-based criteria to the information to determine the availability and/or performance of the resources, the means for receiving and applying further comprising a means for generating a message to a controller of said means for receiving; and means for modifying a behavior of the computer application based on the information collected by the monitoring means, the means for modifying comprising a plurality of actuators configured to modify a single component of the application.

19. The system of claim 18, additionally comprising means for displaying the performance of at least a portion of the resources required by the computer application.

* * * * *